(12) United States Patent
Porat et al.

(10) Patent No.: US 8,306,305 B2
(45) Date of Patent: Nov. 6, 2012

(54) BONE SEGMENTATION

(75) Inventors: Hadar Porat, Tel-Aviv (IL); Gad Miller, Paris (FR); Shmuel Akerman, Binyamina (IL); Ido Milstein, Tel-Aviv (IL)

(73) Assignee: Algotec Systems Ltd., Ra'anana (IL)

( * ) Notice: Subject to any disclaimer, the term of this patent is extended or adjusted under 35 U.S.C. 154(b) by 0 days.

(21) Appl. No.: 13/152,390

(22) Filed: Jun. 3, 2011

(65) Prior Publication Data

US 2011/0228996 A1 Sep. 22, 2011

Related U.S. Application Data

(62) Division of application No. 11/886,230, filed as application No. PCT/IL2005/000302 on Mar. 17, 2005, now Pat. No. 8,094,906.

(51) Int. Cl.
*G06K 9/00* (2006.01)
*G06K 9/34* (2006.01)
*G06K 9/62* (2006.01)

(52) U.S. Cl. ........ 382/131; 382/128; 382/153; 382/173; 382/180; 382/224; 382/225

(58) Field of Classification Search .................. None
See application file for complete search history.

(56) References Cited

U.S. PATENT DOCUMENTS

| | | | | |
|---|---|---|---|---|
| 6,744,911 B1 * | 6/2004 | Avila et al. | ..................... | 382/131 |
| 7,123,760 B2 * | 10/2006 | Mullick et al. | ................. | 382/131 |
| 7,167,180 B1 * | 1/2007 | Shibolet | ......................... | 345/474 |
| 7,194,117 B2 * | 3/2007 | Kaufman et al. | ............. | 382/128 |
| 7,379,062 B2 * | 5/2008 | Poole | ............................. | 345/424 |
| 7,616,794 B2 * | 11/2009 | Moeller | ......................... | 382/128 |
| 2003/0053697 A1 * | 3/2003 | Aylward et al. | ............... | 382/203 |
| 2003/0056799 A1 * | 3/2003 | Young et al. | .................. | 128/922 |
| 2004/0101183 A1 | 5/2004 | Mullick et al. | | |
| 2007/0116332 A1 * | 5/2007 | Cai et al. | ....................... | 382/128 |

FOREIGN PATENT DOCUMENTS

| | | |
|---|---|---|
| EP | 1 225 542 | 7/2002 |
| EP | 1 447 772 | 8/2004 |
| WO | WO 2006/097911 | 9/2006 |

OTHER PUBLICATIONS

Fiebich et al., "Automatic bone segmentation technique for CT angiographic studies", Journal of Computer Assisted Tomography, 1999, pp. 155-161.*
Lemke et al., "Automated detection and segmentation of lumbar vertebrae in CT and CTA images based on a grey-value profile parser", Computer Assisted Radiology and Surgery, 1997, pp. 209-214.*

(Continued)

*Primary Examiner* — Tom Y Lu
*Assistant Examiner* — Thomas Conway

(57) ABSTRACT

A method of automatically identifying bone components in a medical image data set of voxels, the method comprising: a) applying a first set of one or more tests to accept voxels as belonging to seeds, b) applying a second set of one or more tests to accept seeds as bone seeds, and c) expanding the bone seeds into bone components by progressively identifying candidate bone voxels, adjacent to the bone seeds or to other previously identified bone voxels, as bone voxels, responsive to predetermined criteria which distinguish bone voxels from voxels of other body tissue.

6 Claims, 13 Drawing Sheets

OTHER PUBLICATIONS

Abdalmajeid M. Alyassin et al., "Semi-automatic bone removal technique from CT angiography data," Proceedings of SPIE, vol. 4322, 2001, pp. 1273-1282.

Thomas H. Cormen et al., *Introduction to Algorithms, Section 25.2, Dijkstra's algorithm*, MIT Press, 1990, pp. 527-531.

Martin Fiebich et al., "Automatic Bone Segmentation Technique for CT Angiographic Studies," Journal of Computer Assisted Tomography, vol. 23, No. 1, 1999, pp. 155-161.

Alejandro F. Frangi et al., "Multiscale Vessel Enhancement Filtering," Medical Image Computing and Computer-Assisted Intervention—MICCAI '98, Proceedings of the First International Conference, 1998, pp. 130-137.

F. Lohier et al., "A Software Engineering Methodology to Optimize Caching in Multi-processor DSP Architectures: TMS320C80 Results towards the Real-time Execution of Low Level Image Processing," Application-Specific Systems and Software Engineering and Technology, 1999. Asset '99. Proceedings. 1999, 9 pages, XP-10329585.

Cristian Lorenz et al., "Automated detection and segmentation of lumbar vertebrae in CT and CTA images based on grey-value profile parser," Computer Assisted Radiology and Surgery, Proceedings of the 11th International Symposium and Exhibition, CAR '97, 1997, pp. 209-214.

Matúš Straka et al., "Bone Segmentation in CT-Angiography Data Using a Probabilistic Atlas," Proceedings of Vision Modeling and Visualization, 2003, 8 pages, XP-002359576.

Gianni L. Vernazza et al., "A Knowledge-Based System for Biomedical Image Processing and Recognition," IEEE Transactions on Circuits and Systems, vol. CAS 34, No. 11, Nov. 1987, pp. 1399-1416.

Communication Relating to theResults of the Partial International Search dated Apr. 12, 2007 from the Internationa Searching Authority Re.: Application No. PCT/IL2005/000302, 3 pages.

International Preliminary Report on Patentability dated Jul. 19, 2007 from the International Preliminary Examining Authority Re.: Application No. PCT/IL2005/000302, 19 pages.

International Search Report dated Jan. 18, 2006 from the International Searching Authority Re.: Application No. PCT/IL2005/000302, 7 pages.

Written Opinion dated Jan. 18, 2006 from the International Searching Authority Re.: Application No. PCT/IL2005/000302, 13 pages.

SAS Institute, "Miscellaneous Formulas," The Cluster Procedure, SAS Institute Inc., 2011, 2 pages.

Wikipedia, "Heapsort," Wikipedia the Free Encyclopedia, Aug. 15, 2011, 8 pages.

Wikipedia, "Sorting Algorithm," Wikipedia the Free Encyclopedia, Aug. 15, 2011, 7 pages.

* cited by examiner

BONE SEGMENTATION

CROSS REFERENCE TO RELATED APPLICATIONS

This is a Divisional of U.S. Ser. No. 11/886,230 entitled BONE SEGMENTATION, filed on Sep. 13, 2007 now U.S. Pat. 8,094,906 and published as US 2009/0122060, which claims priority to PCT/IL05/00302 entitled BONE SEGMENTATION, filed on Mar. 17, 2005, which published as WO 2006/097911.

FIELD OF THE INVENTION

The field of the invention relates to methods and apparatus for distinguishing bones from other body tissues, especially blood vessels, in 3D medical images, especially CT scans.

BACKGROUND OF THE INVENTION

In angiographic CT scans, a contrast agent is typically injected into the blood, and three-dimensional data is obtained giving the image density of each voxel in the body or in a region of the body. Typically this data is displayed using a maximum intensity projection (MIP), so that the blood vessels can be examined. However, in a MIP image many blood vessels would be obscured by bones, which have image density comparable to the blood vessels containing contrast agent, so it is desirable to remove the bones from the 3D image before producing the MIP image. This may be accomplished by bone segmentation, i.e. a method to distinguish bone voxels from voxels of other tissue, particularly from blood vessel voxels. Although bone segmentation can be done manually by a doctor examining slices of the 3D image, such a task is very time-consuming and tedious.

Two published US patent applications assigned to General Electric, 2003/0194119 to Manjeshwar et al, and 2003/0113003 to Cline et al, the disclosures of which are incorporated herein by reference, describe semi-automated methods of tissue segmentation. These publications describe the use of single-voxel seeds, chosen by the user as belonging to a body tissue of interest, which are automatically expanded to find the entire connected volume of that tissue, in this case a tumor found by a PET scan, and amyloid plaque found by MRI. General Electric also sells a product called Advantage Windows, which does fully automated segmentation of bone for CT scans. In practice, it is not possible to distinguish bone voxels from blood vessel voxels with 100% accuracy; even two different doctors, attempting to do this task manually, will generally not agree on all voxels.

Alejandro F. Franji, Wiro J. Niessen, Koen L. Vincken, and Max A. Viergever, "Multiscale vessel enhancement filtering," Lecture Notes in Computer Science 1496, 130 (1998), the disclosure of which is incorporated herein by reference, describes a method of distinguishing blood vessels from other body tissue, using a "vesselness" measure which depends on the ordered eigenvalues of the Hessian matrix of the image density, in either a 2D or 3D image. The vesselness measure is high for long narrow structures such as blood vessels, and low for blob-like or plate-like structures, or background noise.

SUMMARY OF THE INVENTION

An aspect of some embodiments of the invention concerns automated segmentation of bones. In an exemplary embodiment of the invention, one or more bone "seeds" are found according to a bone seed identifying procedure which ideally excludes all blood vessel "seeds." Here, a bone seed means a connected set of voxels which is believed to be part of a bone, and which can be used to find the complete bone by expanding it, i.e. by repeatedly adding to it neighboring voxels which are also believed to be bone voxels. A blood vessel seed would be a similar connected set of voxels which includes at least some blood vessel voxels, and it is a goal of the identifying procedure to distinguish between the blood vessel seeds and the bone seeds. In some embodiments of the invention, bone seeds are distinguished from blood vessel seeds because bones tend to have their peak image density near their surface and the image density tends to fall rather steeply from its peak value in both directions on an axis normal to the surface of the bone, while blood vessels, with contrast agents increasing the image density of the blood, tend to have high and very uniform image density across the lumen, and much lower image density outside the lumen. The procedure for finding bone seeds is conservative, in that it is not designed to find all or even most of the bone seeds, only to exclude blood vessel seeds, and preferably to find at least some bone seeds from each bone.

The bone seeds are then expanded into bone components, which include all or almost all of the remaining bone voxels, using a bone seed expanding procedure for deciding which new voxels to accept, which avoids expanding into neighboring blood vessels, responsive to various predetermined criteria for distinguishing bone voxels from voxels of blood vessels and other body tissue. Optionally the bone seeds, before expanding, each comprise more than one voxel. In some embodiments of the invention, it is important to eliminate blood vessel seeds before expanding the bone seeds, because if a blood vessel seed has been mistaken for a bone seed and expanded, it may not be possible to correct for later.

Optionally the procedure for identifying bone seeds includes one or more of requiring voxels to have at least a minimum image density, and requiring a seed to have at least a minimum volume of connected voxels which exceed a minimum image density. Optionally, the procedure for distinguishing bone seeds from blood vessel seeds examines the extent to which the image density has a local maximum, along an axis, at or near a voxel in the seed, and falls steeply going away from the local maximum in both directions along the axis, as would be expected for a voxel near the densest part of a bone, near its surface, along an axis normal to the surface of the bone. There are various tests that can be used, individually or in combination, to accomplish such an examination, including requiring a surface to volume ratio of the seed to exceed a minimum value, requiring the density profile of the seed or its vicinity to have at least a minimum measure of hollowness, and requiring that a seed not have too great a resemblance to a blood vessel, i.e. not look too much like a long straight circular cylinder of high density voxels surrounded by low density voxels. The resemblance of a seed to a blood vessel is defined in a quantitative way by calculating a "vesselness" score for it, for example.

Optionally, in order to make the bone seed identifying procedure sufficiently stringent to (ideally) exclude all blood vessel seeds, it also excludes many bone seeds, but preferably keeps at least one bone seed from each bone, so that all bones are sure to be found when the bone seeds are expanded. Even if there are some bones for which no bone seeds are found, it may still be possible to find those bones, if they are very close to other bones, as in the case of the vertebrae, for example, where expanding a bone seed in one vertebra can end up including bone voxels in a neighboring vertebra. But finding at least one bone seed from each bone has the potential advantage of ensuring that all the bones are found.

The bone expansion procedure also optionally involves using a local hollowness of the density profile near a voxel, and/or a "vesselness" of a voxel, in deciding which neighboring voxels to include as bone voxels.

Optionally, a bone component is further expanded a short distance past the last surface after the bone expansion procedure is completed, in order to include as bone voxels those voxels which only partly overlap the bone, and which have average density that is too low for them to have been included in the bone component before such expansion. Such voxels are unlikely to belong to blood vessels, since generally there are no blood vessels so close to the surface of bones.

Optionally, the bone component is further expanded into completely enclosed or almost completely enclosed lower density regions inside the bone, including marrow, for example, even though the voxels in those regions were not included according to the bone expansion procedure. Although lower density than the rest of the bone, such regions can, for example, obscure blood vessels in a MIP image, so it is useful to include them in the bone components.

Optionally, different procedures are used for finding and expanding bone seeds in different bones. In particular, different procedures are optionally used for the large leg bones (femur, tibia, and fibula), for the knees (patella), and for other bones outside the legs.

An aspect of some embodiments of the invention concerns automated segmentation of bones, in which the locations of the large leg bones (or of seeds for the large leg bones, optionally only one seed per bone) are found first, using a procedure that is different from the bone seed identification procedure and bone expansion procedure used to find other bones. Once the large leg bones have been identified, it is possible to apply criteria which exclude the aorta and other large blood vessels from consideration as bones, even if those criteria would also have excluded the large leg bones from consideration as bones. Optionally, the location of the large leg bones (or their seeds) is used to find the patellas.

There is thus provided, in accordance with an exemplary embodiment of the invention, a method of automatically identifying bone components in a medical image data set of voxels, the method comprising:
  a) applying a first set of one or more tests to accept voxels as belonging to seeds, wherein none of the tests examine an extent to which the image density has a local maximum at or near a voxel and falls steeply going away from the local maximum in both directions along an axis;
  b) applying a second set of one or more tests to accept seeds as bone seeds, at least one of the tests requiring at least one voxel belonging to the seed to have a local maximum in image density at or near said voxel, with the image density falling sufficiently steeply in both directions along at least one axis; and
  c) expanding the bone seeds into bone components by progressively identifying candidate bone voxels, adjacent to the bone seeds or to other previously identified bone voxels, as bone voxels, responsive to predetermined criteria which distinguish bone voxels from voxels of other body tissue.

Optionally, the data set and the second set of tests are such that applying the second set of tests accepts as bone seeds less than 50% of the seeds whose voxels are later all identified as bone voxels when the bone seeds are expanded.

Optionally, applying the second set of tests comprises finding a ratio of a number of surface voxels to a total number or voxels in the seed.

Optionally, applying the second set of tests comprises finding a ratio of an average image density of the voxels on the surface of the seed to an average image density of all the voxels in the seed.

Optionally, applying the second set of tests comprises finding a hollowness measure of the seed.

Optionally, applying the second set of tests comprises finding a vesselness score of a voxel of the seed, which score depends on a resemblance of the voxel and other voxels in its vicinity to a blood vessel-like structure.

Optionally, applying the second set of tests comprises rejecting at least some seeds because an average of their image density is too great.

Optionally, applying the first set of tests comprises requiring voxels to have at least a minimum image density.

Optionally, applying the first set of tests comprises requiring voxels to be interior voxels of a connected volume of voxels in which all the voxels in the connected volume have an image density greater than a minimum image density.

Optionally, applying the first set of tests comprises requiring voxels to be part of a connected set of voxels greater than a minimum total volume, all having an image density greater than a minimum image density.

In an embodiment of the invention, expanding the bone seeds comprises using a Dijkstra algorithm, comprising identifying a candidate voxel as a bone voxel if said candidate voxel has a score less than a threshold value, the score of a candidate voxel being the minimum integral, along any connected path of voxels from a bone seed voxel to said candidate voxel, of a local cost of the voxels along the path.

Optionally, the local cost of a voxel depends on a hollowness of an image density profile in the vicinity of the voxel.

Optionally, the local cost of a voxel depends on a vesselness score of the voxel which reflects a resemblance of the voxel and other voxels in its vicinity to a blood vessel-like structure.

Optionally, the vesselness score of the voxel depends on the eigenvalues of a Hessian matrix of the image density at the voxel and its vicinity.

Optionally, the elements of the Hessian matrix comprise a convolution of the image density with the second derivative of a peaked function of width comparable to the width of an iliac artery near the pelvis.

Optionally, the full width at half maximum of the peaked function is between 4 and 6 millimeters.

Alternatively or additionally, the elements of the Hessian matrix comprise a convolution of the image density with the second derivative of a peaked function of a width which depends on the location of the voxel in the body.

Optionally, using the Dijkstra algorithm comprises:
  a) identifying and finding the local cost of each voxel in an envelope of the bone seeds;
  b) setting the bone components to be the bone seeds initially;
  c) storing the voxels in the envelope in a heap, ordered by their local cost, and:
  d) removing the lowest local cost voxel from the head of the heap, without rectifying the heap, and adding said voxel to the bone components;
  e) identifying neighboring voxels of the lowest local cost voxel;
  f) finding the local cost of each neighboring voxel that is not already in the bone components or in the envelope;
  g) adding each of said neighboring voxels to the envelope and to the heap, rectifying the heap after each voxel is added;

h) rectifying the heap, if the heap is not already rectified; and i) repeating (d) through (h) until a stop condition is reached.

Optionally, the method also includes further expanding the bone components to include at least some adjacent voxels which only partially overlap the bone.

Optionally, the method also includes further expanding the bone components to include voxels which are in the interior of a bone, but have too low an image density to be included in the bone components when the bone seeds are expanded.

There is further provided, in accordance with an exemplary embodiment of the invention, a method of automatically identifying bone voxels in a medical image data set of voxels that includes at least a portion of the large bones of the legs and at least a portion of the bones outside the legs, the method comprising:

a) identifying at least a portion of the voxels belonging to large bones of the legs by applying a first procedure to the voxels of the data set; and b) identifying at least a portion of the voxels belonging to bones of the body outside the legs, by applying a second procedure to the voxels of the data set, which second procedure is different from the first procedure.

Optionally, the image data set is defined in a Cartesian coordinate system where the z axis is a longitudinal axis of the body, and the x axis is a left-right axis of the body, and wherein applying the first set of criteria comprises:

a) finding connected regions of voxels which have image density exceeding a threshold value;

b) for each connected region, finding the range W in x-coordinate, the range H in y-coordinate, and the range D in z-coordinate, of the centers of the voxels in the region; and c) identifying as belonging to the large leg bones a set of the connected regions for which W is comparable to H, and D is longer than for other such connected regions.

Optionally, the data set is defined with a z-coordinate where the z axis is a longitudinal axis of the body, and the method also includes identifying at least a portion of the voxels belonging to the knee bones by:

a) distinguishing femur voxels from lower leg bone voxels by their z-coordinates; and b) identifying as belonging to the knee bones, voxels exceeding a threshold image density, whose z-coordinates are intermediate between the range of z-coordinates of the femur voxels and the range of z-coordinates of the lower leg bone voxels.

Alternatively or additionally, the data set is defined with a z-coordinate where the z axis is a longitudinal axis of the body, and the first procedure comprises selecting voxels having image density greater than a first threshold value, such that only voxels in a central portion of each of the large bones of the legs are identified, and the method also comprises identifying voxels belonging to end portions of the large bones of the legs, by selecting voxels which have image density greater than a second threshold value lower than the first threshold value, and which have their z-coordinate within a range determined by the locations of the voxels in the central portions of the large bones of the legs.

There is further provided, in accordance with an exemplary embodiment of the invention, a method of identifying bone voxels in a medical image data set of voxels stored in a first memory, the method comprising:

a) choosing a first voxel to examine;

b) transferring, from the first memory to a faster memory, data of a first subset of the voxels defined by their spatial relationship to the first voxel;

c) judging whether the first voxel is a bone voxel, using the data of the first subset stored in the faster memory;

d) choosing a second voxel to examine;

e) after transferring the data of the first subset, transferring, from the first memory to the faster memory, data of a second subset of the voxels defined by their spatial relationship to the second voxel, excluding at least one voxel in the second subset whose data was already transferred because it also belongs to the first subset; and f) judging whether the second voxel is a bone voxel, using the data of the second subset stored in the faster memory.

There is further provided, in accordance with an embodiment of the invention, an apparatus for automatically identifying bone voxels in a medical image data set, comprising a computer with sufficient real or virtual memory to store the data set, the computer being programmed to use a method according to an embodiment of the invention.

Optionally, the program is efficient enough, and the computer has a CPU fast enough, for the computer to complete the program in less than 10 minutes, for a data set with voxels that are 1 mm long, and 0.5 mm by 0.5 mm in cross-section, covering 1.5 meters of the body from the neck to the ankles.

Optionally, the program is efficient enough, and the computer has a CPU fast enough, for the computer to complete the program for said data set in about one minute or less.

BRIEF DESCRIPTIONS OF THE DRAWINGS

Exemplary embodiments of the invention are described in the following sections with reference to the drawings. The drawings are generally not to scale and the same or similar reference numbers are used for the same or related features on different drawings.

Figure 5:
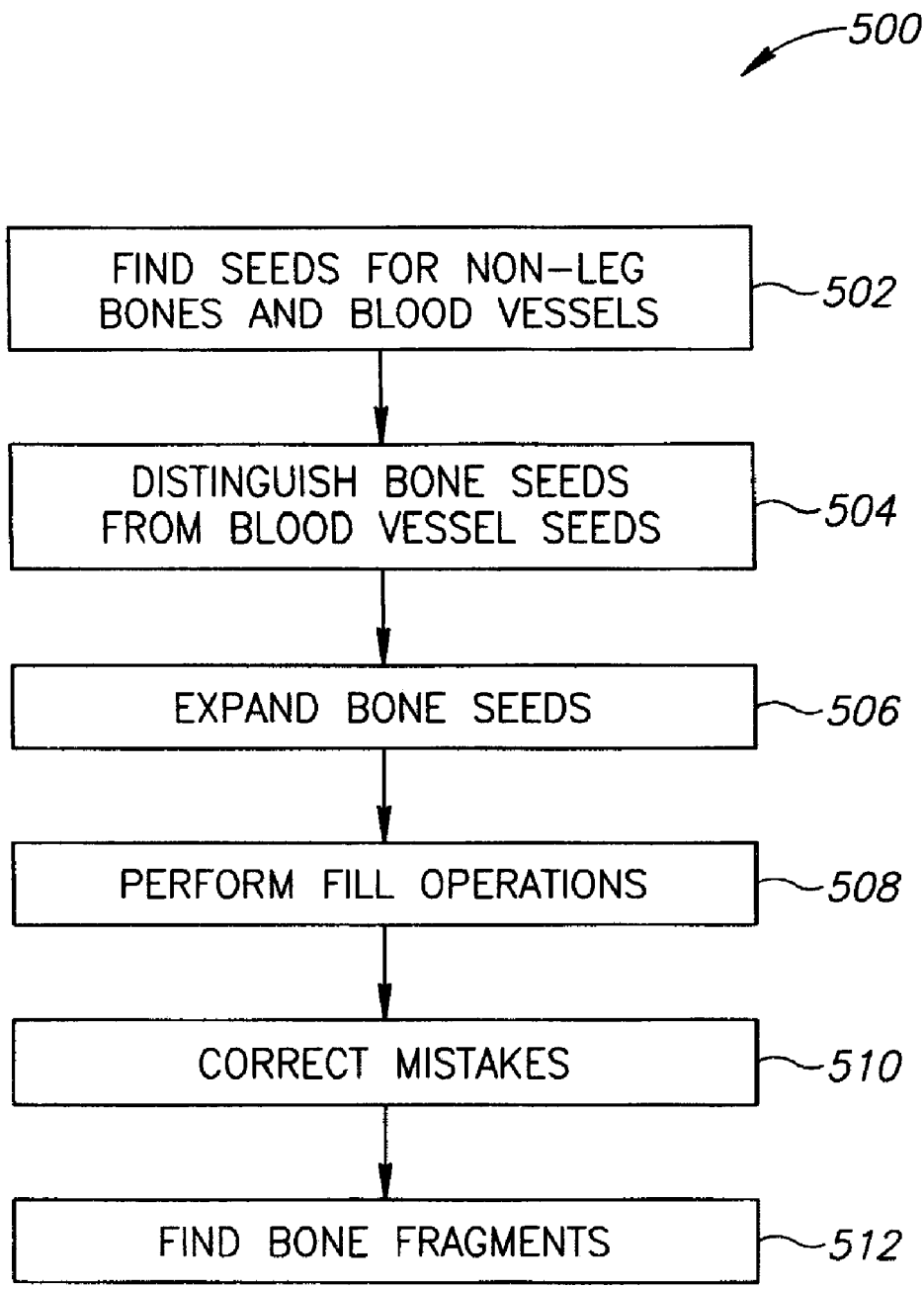
FIG. 5 is a flowchart showing an overview of a method for finding bones other than leg bones in accordance with an exemplary embodiment of the invention.
Figure 7:
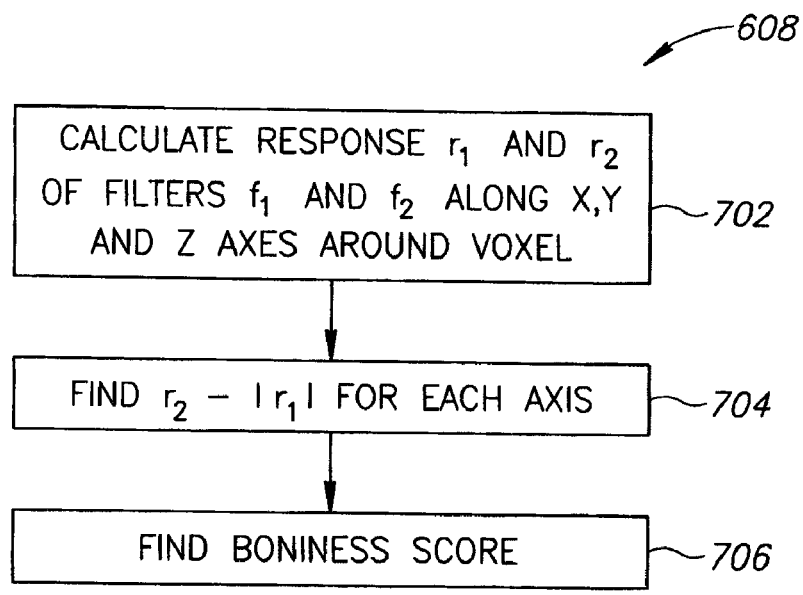
FIG. 7 is a flowchart showing a method for finding the boniness score of a voxel, a detail of the method shown in FIG. 6.
Figure 8A:
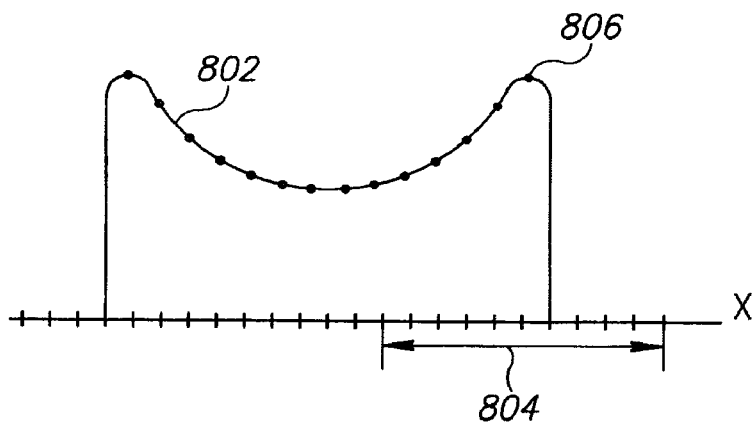
Figure 8B:
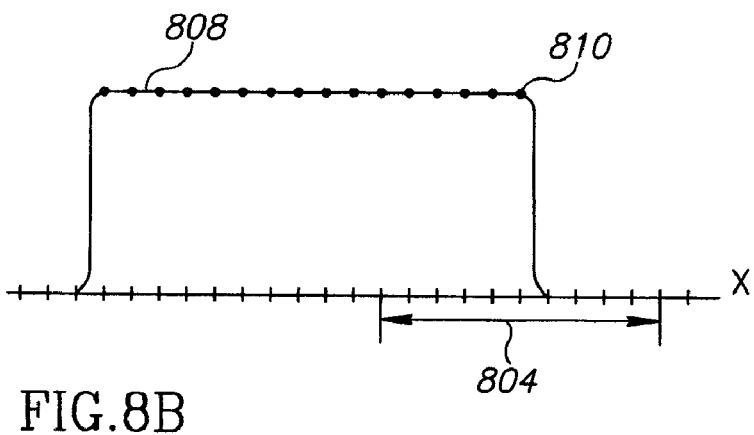
Figure 9A:
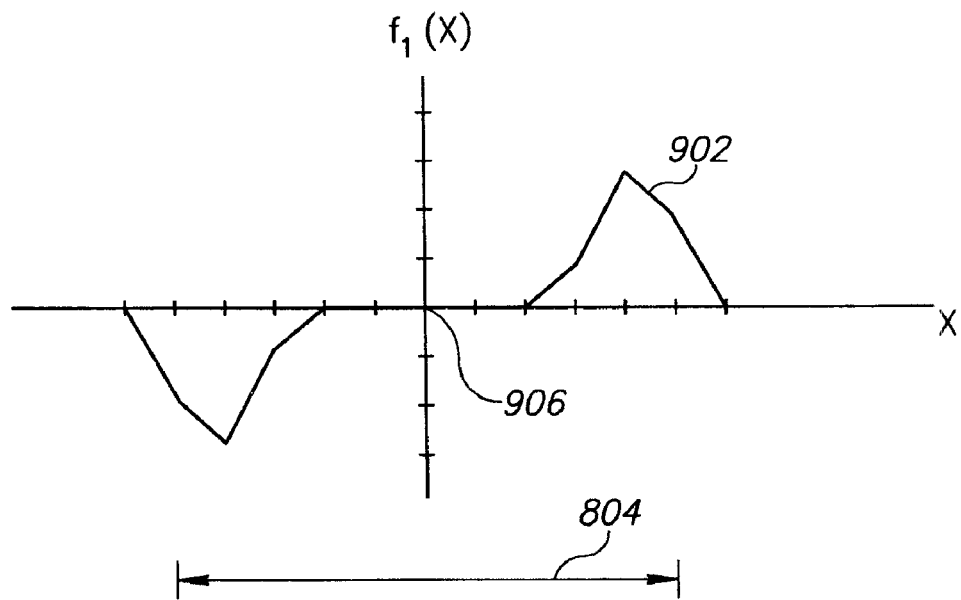
Figure 9B:
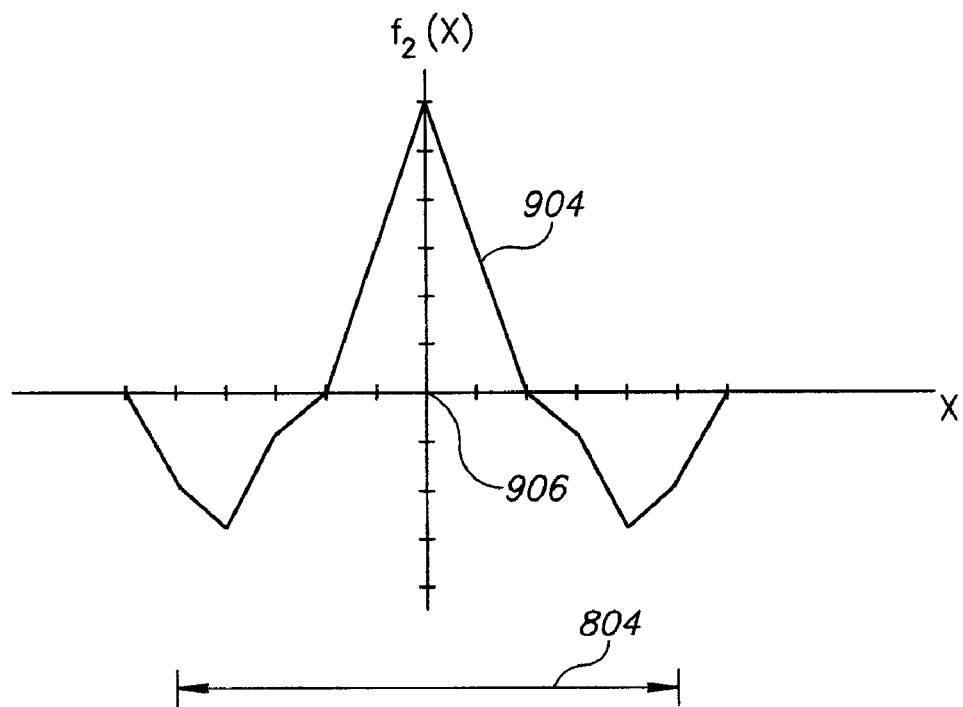
Figure 10A:
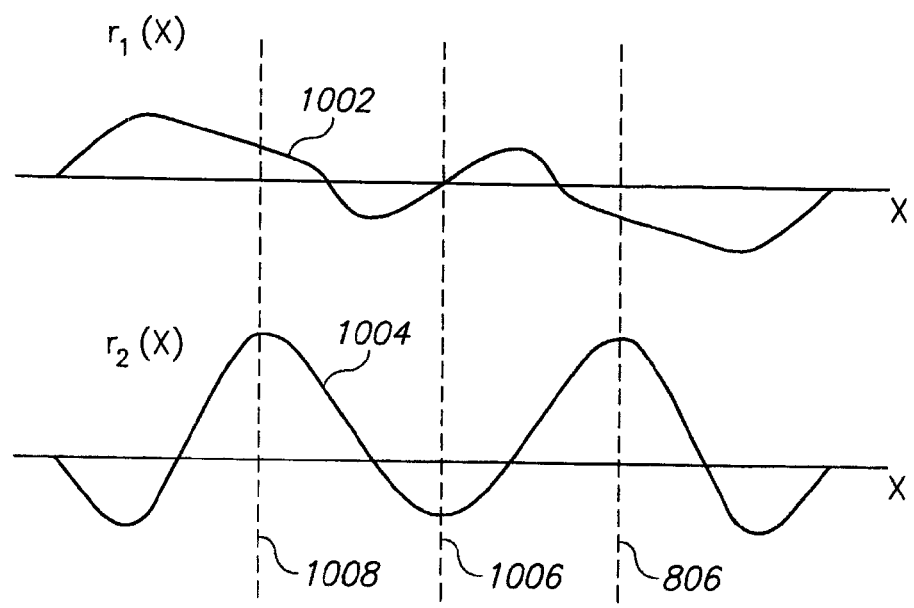
Figure 10B:
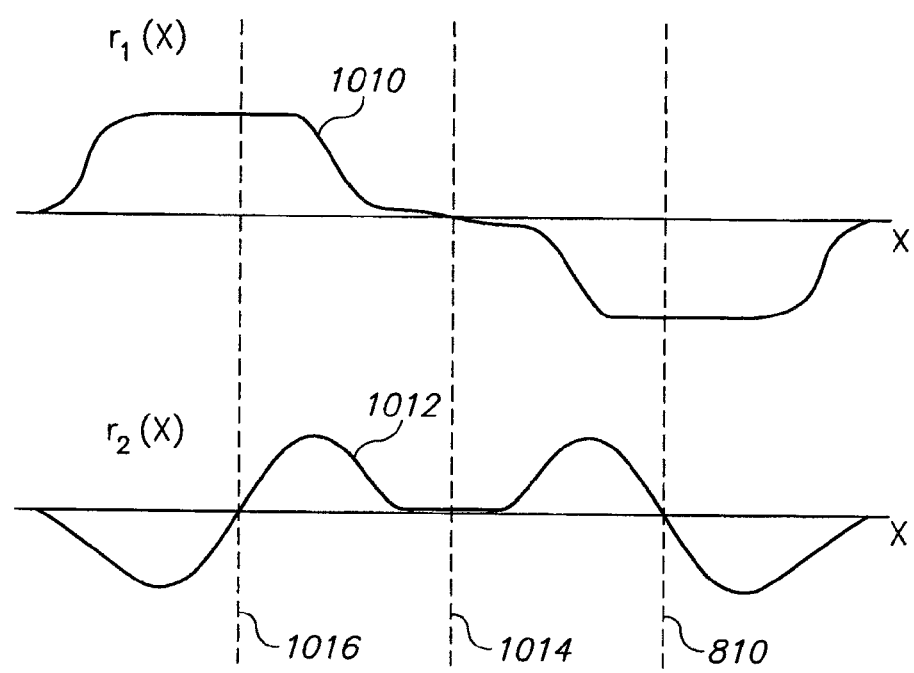
Figure 11A:
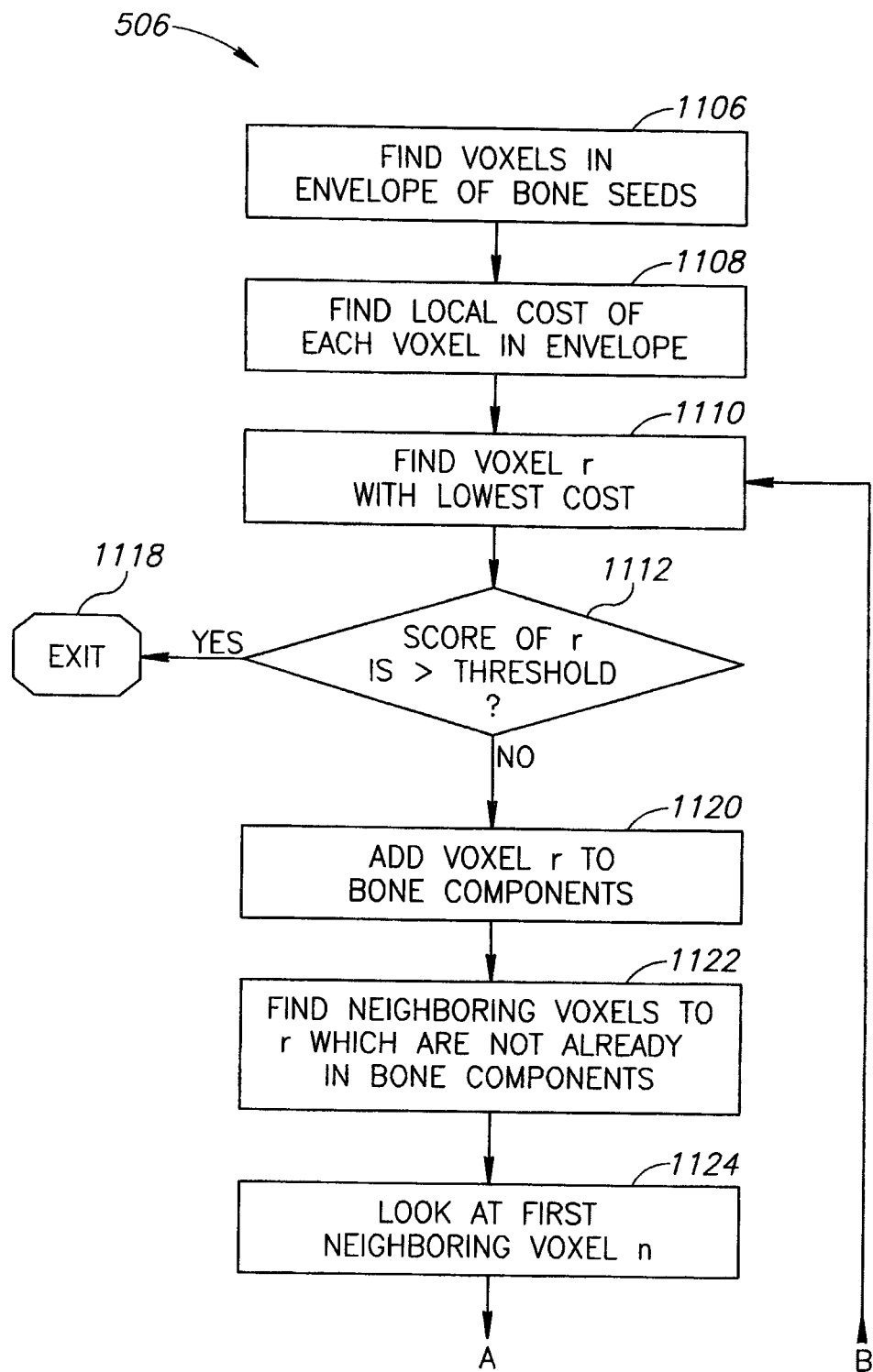
Figure 11B:
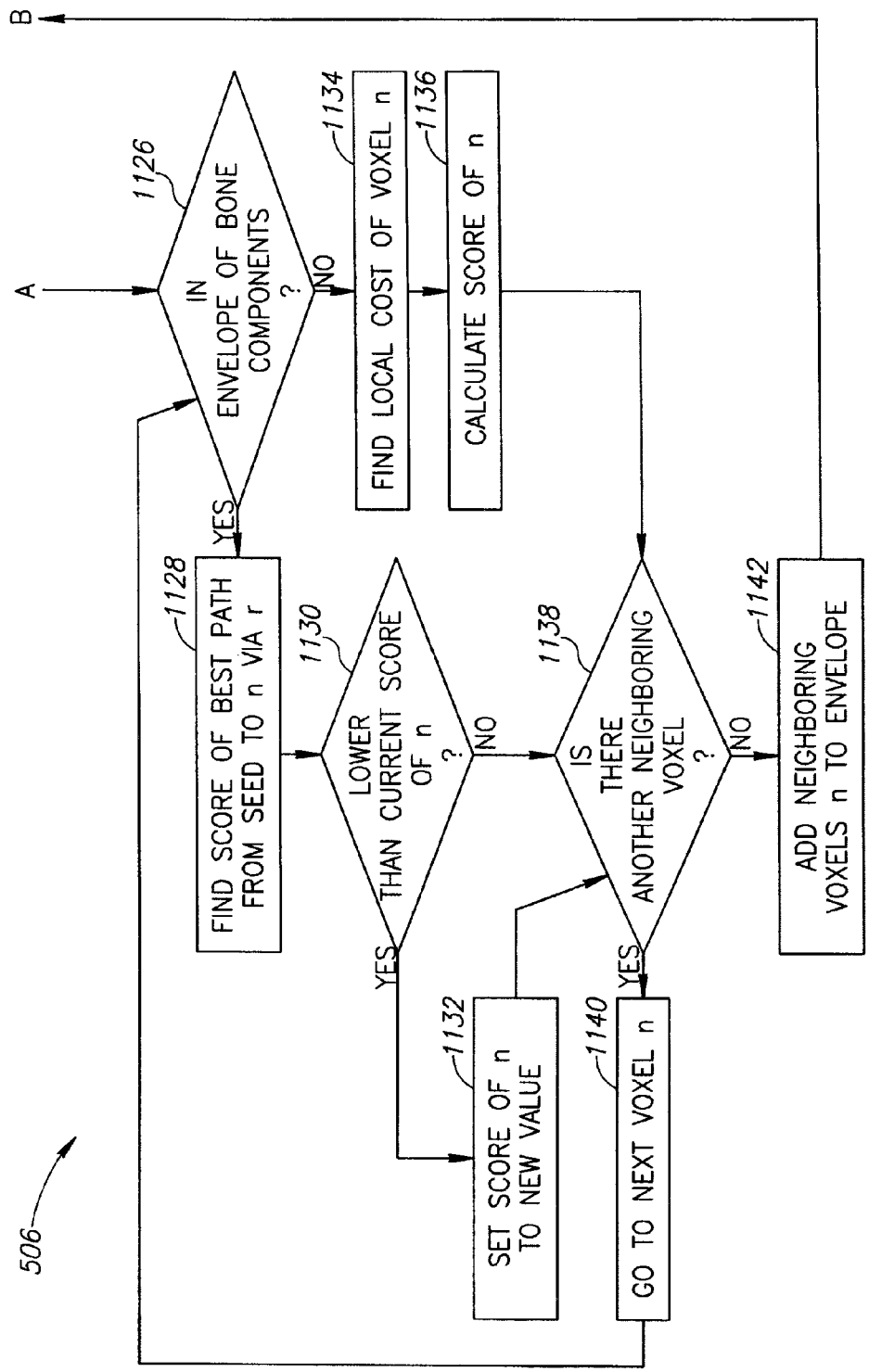
Figure 12:
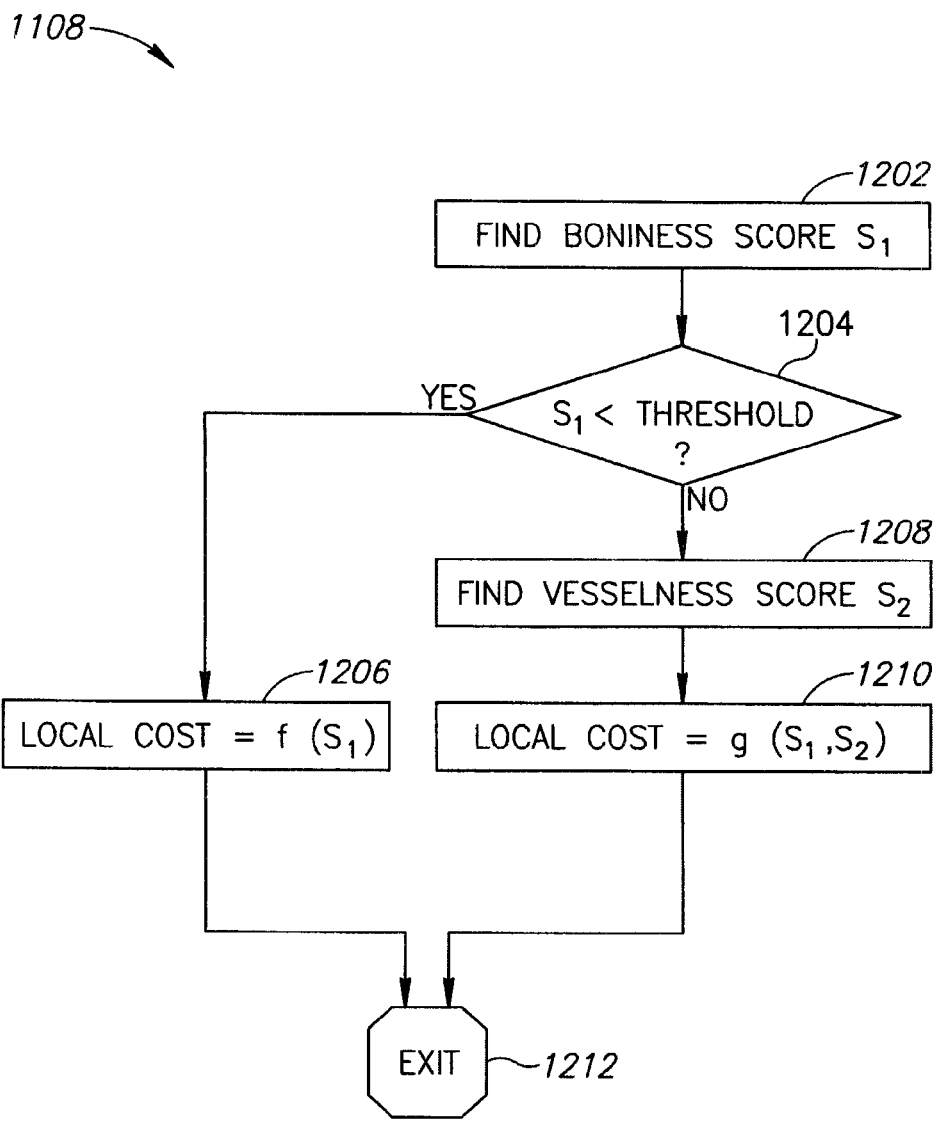

FIGS. 8A and 8B schematically show radial density profiles for a typical bone and a typical blood vessel respectively that are analyzed by the method shown in FIG. 7;

FIGS. 9A and 9B show plots of exemplary filter functions f1 and f2 used by the method shown in FIG. 7;

FIGS. 10A and 10B schematically show plots of the responses of the radial density profiles shown in FIGS. 8A-8B to each of the filters shown in FIGS. 9A and 9B, as would be calculated by the method shown in FIG. 7;

FIGS. 11A and 11B show a flowchart showing an overview of a method for expanding bone seeds, a detail of the method shown in FIG. 5;

FIG. 12 is a flowchart showing a method for calculating the local cost for a voxel, a detail of the method shown in FIGS. 11A and 11B.

Figure 13:
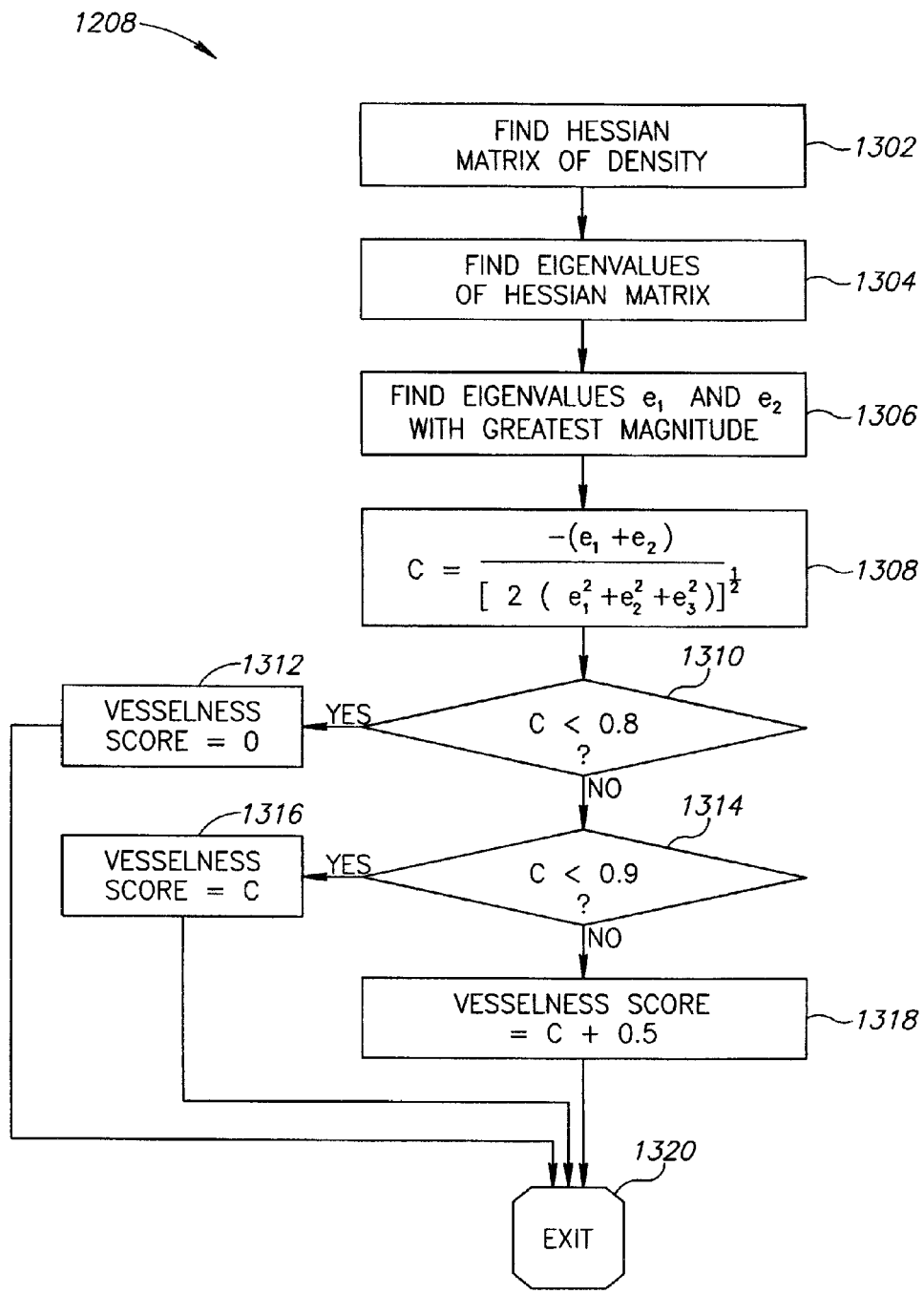
Figure 14A:
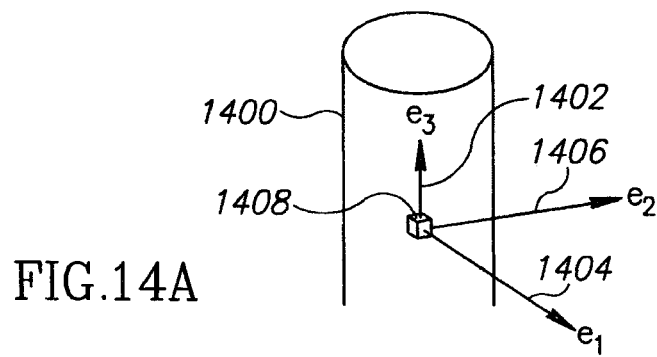
Figure 14B:
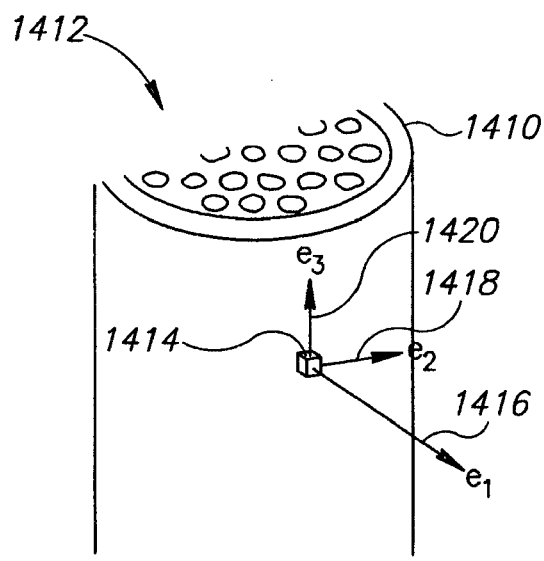
Figure 14C:
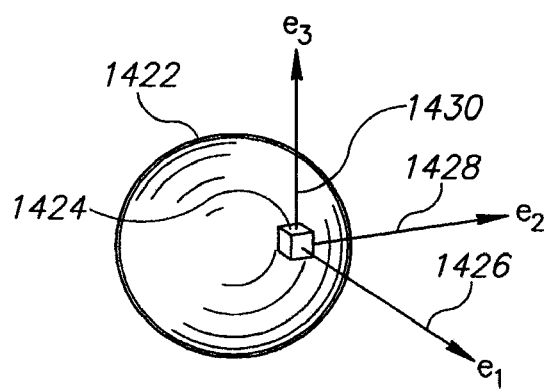

FIG. 13 is a flowchart showing a method for calculating vesselness, a detail of the method shown in FIG. 12;

FIG. 14A is a schematic view of a voxel on the surface of a blood vessel, showing exemplary directions of the eigenvectors and magnitudes of the corresponding eigenvalues of the Hessian matrix for the density, as would be calculated by the method shown in FIG. 13;

FIG. 14B is a schematic view of a voxel on the surface of a hollow bone with a relatively thin shell, showing exemplary directions of the eigenvectors and magnitudes of the corresponding eigenvalues of the Hessian matrix for the density, as would be calculated by the method shown in FIG. 13; and FIG. 14C is a schematic view of a voxel on the surface of spherically symmetric object, showing exemplary directions of the eigenvectors and magnitudes of the corresponding eigenvalues of the Hessian matrix for the density, as would be calculated by the method shown in FIG. 13.

DETAILED DESCRIPTION OF EXEMPLARY EMBODIMENTS

Figure 1:
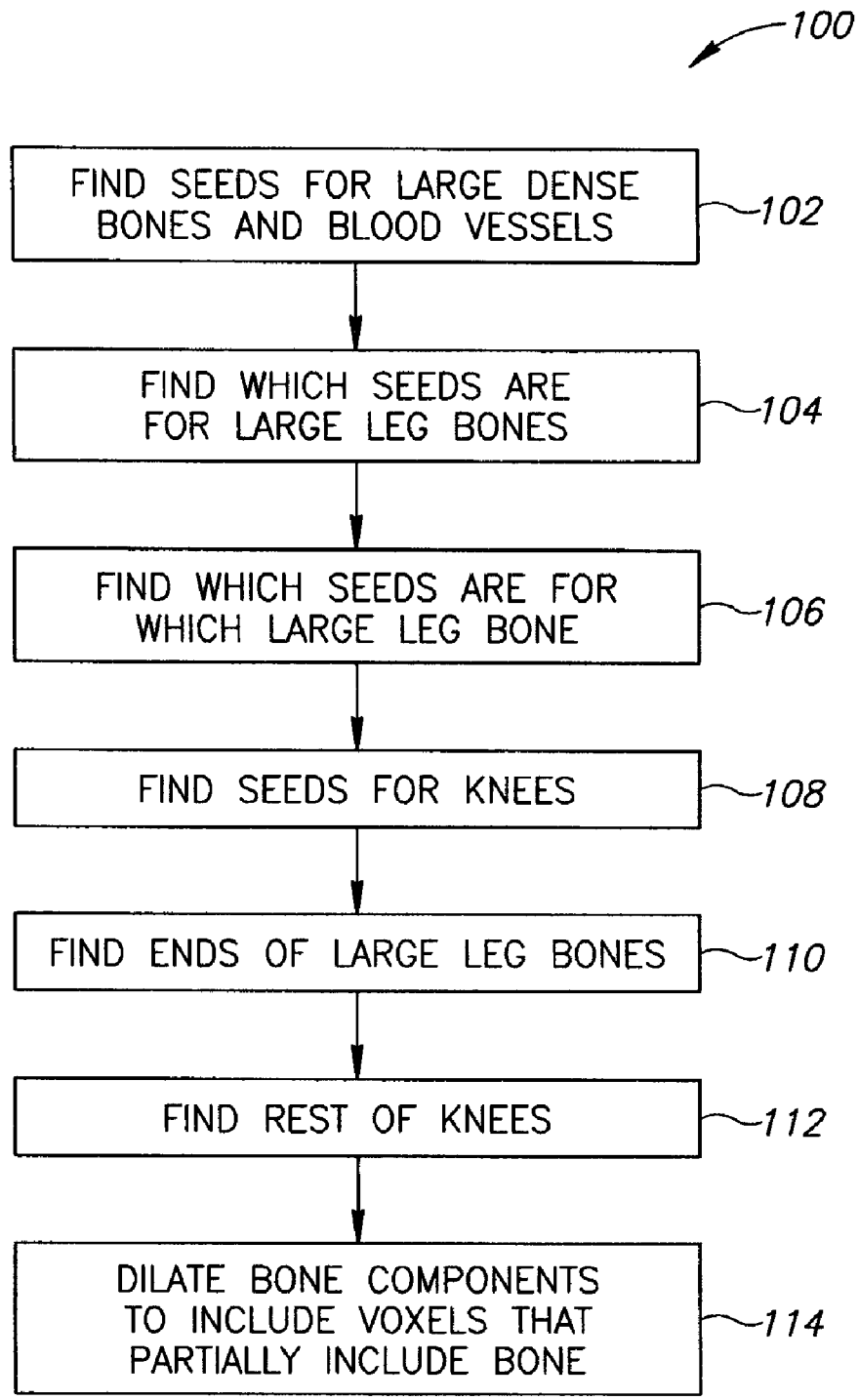
FIG. 1 is a flowchart for a method for delineating the leg bones in accordance with an exemplary embodiment of the invention.

FIG. 1 shows a flowchart 100, providing an overview of a method optionally used to find leg bones, optionally before finding the rest of the bones in the body. The larger leg bones, the femur, tibia and fibula, are the longest bones in the body, and there are no very large blood vessels in the legs which could be mistaken for these bones, so in some embodiments of the invention it is advantageous to find the leg bones first, using a different method than that used to find the other bones.

The rest of this description gives further details of the method used to find the leg bones, and an overview and details of a method used to find the other bones, and to avoid mistaking blood vessels for bones, even though blood vessels with contrast agent and bones may have similar high image densities.

Find Seeds for the Large Leg Bones

At 102, seeds are found for the large leg bones, in an exemplary embodiment of the invention. The method of 102 is designed to find only a single seed for each of the large leg bones. Typically the method used at 102 also finds seeds for other large bones, and seeds for blood vessels not in the legs, often more than one seed per bone or per blood vessel. The method of 102 is optionally done by first finding a first set of possible bone voxels, called bv1, consisting of all the voxels in the CT data set for which the image density is greater than a threshold T1, for example greater than 1900. This value, as well as all other values of image density given herein, is optionally given in Hounsfield units, a standard measure of image density in CT images. The set bv1 will in general include only the densest parts of the bones, and blood vessels with a high concentration of contrast agent.

Voxels are then optionally removed from the set bv1 if they are not part of a connected volume of at least a minimum size, for example at least 0.125 cubic centimeters. This procedure keeps the seeds of the large leg bones, which are expected to have a connected volume of image density greater than T1 which is at least that big, and may also keep the seeds of some other large bones and blood vessels, but may exclude the seeds of some smaller bones and blood vessels.

Then a second set of possible bone voxels, called bv2, is optionally found among the voxels of the CT data set, consisting of all voxels with image density greater than a lower threshold T2, for example, 1800. Finally, voxels in bv2 are optionally removed if they are not part of a connected volume which includes voxels from bv1, as expected for the large leg bones.

Alternatively, T1 or T2 or both of them differ from the values given here, as long as T2 is less than T1. For example, either or both of them are up to 5% higher or lower, or between 5% and 10% higher or lower, or between 10% and 20% higher or lower, or more than 20% higher or lower. The values are optionally adjusted, for example, depending on the age, sex, and health of the patient, since these factors may influence the expected image density of the bones, and depending on the concentration of contrast agent in the blood. The values are also optionally adjusted according to the distribution of image densities of voxels in the CT data set, which may provide some information about the patient's bone density even before the bone voxels are identified. The values of T1 and/or T2 are also optionally adjusted iteratively, if the method gives results which appear unreasonable using the first set of values. Using too high a value for T1 and/or T2 may result in failing to find a seed for one or more of the large leg bones, or in finding more than one disconnected seed for one or more of the large leg bones. Using too low a value may result in finding voxels from more than one bone in a same seed, for example finding a seed which includes all or many of the vertebrae of the spinal column, and mistakenly identifying it as the seed of a large leg bone. These remarks about adjusting the image density thresholds apply also to any of the other image density thresholds mentioned in this description, as well as to thresholds of other quantities, such as the boniness score defined below, that are proportional to image density.

Similarly, the minimum connected volume 0.125 cubic centimeters is alternatively larger or smaller, for example up to 20% greater or smaller, or between 20% and 50% greater or smaller, or between 50% and 80% greater or smaller, or between 80% and 100% greater or smaller, or between 100% and a factor of 5 greater. The value chosen may depend, for example, on height of the patient. Using too large a value may result in failure to find one or more of the large leg bones. Using too small a value may result in identifying a non-leg bone as a leg bone. The same remarks apply also to other volume thresholds described below.

Figure 2:
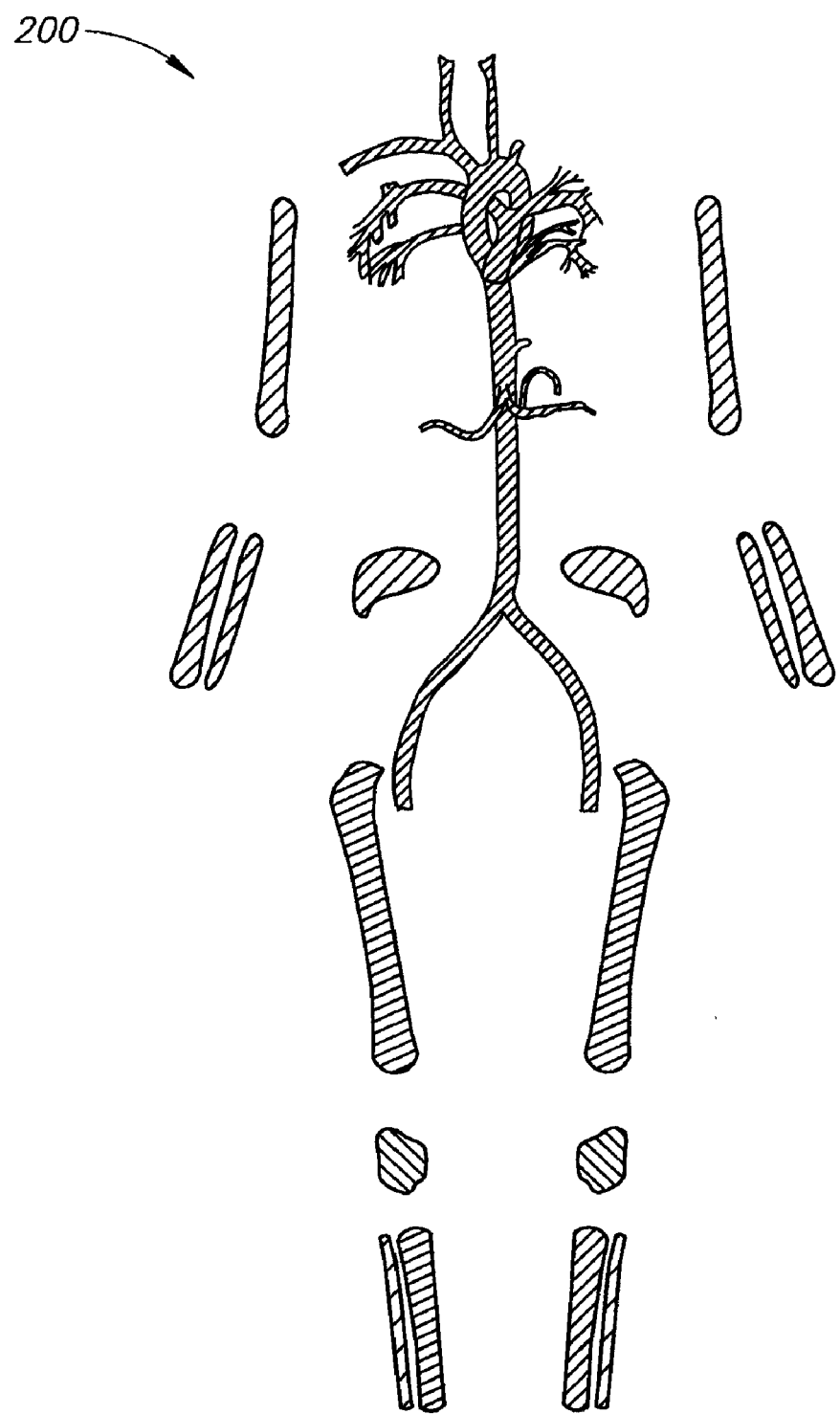
FIG. 2 is a schematic view of large bone and blood vessel components found initially by the method in FIG. 1, in one exemplary run.

The result of this procedure is a set of voxels that includes at least some of the densest parts of the larger bones and blood vessels of the body. FIG. 2 schematically shows such a set 200 of voxels, typical of what set bv2 would look like after the procedure described above. The CT data set used to generate this set of voxels extends from the neck down to the ankles. The different components are shown schematically, for clarity, as flat shapes, but are intended to represent three dimensional forms. People looking at set 200 can readily identify the components as the denser parts of various known large bones and blood vessels, using their knowledge of anatomy, but it should be kept in mind that at this stage the computer does not know the identities of the different components.

At 104 in FIG. 1, the components of bv2 which are seeds of large leg bones are optionally identified. As noted above, there is expected to be only one seed for each large leg bone. The large leg bones differ from other bones and large blood vessels in being unusually long in the z direction, i.e., in the longitudinal direction of the body of the patient, which is assumed to be known. The large leg bones also differ from the aorta (which is also long in the longitudinal direction) by having approximately the same dimensions in the x and y directions, while the aorta, with its wide arch, extends considerably further in the y direction, i.e. in the left-right direction of the body of the patient (also assumed to be known), than in the x direction. Hence, the large leg bones are optionally identified by using a measure of the seed which is large if and only if the seed is long in the z direction, and about equally wide in the x and y directions.

For example, first, a bounding box in the x, y, and z directions is optionally found for each component of bv2. The bounding box need not be a rectangular solid, but could be another shape, for example it could be an elliptical cylinder with axes oriented in the x and y directions. Using a rectangular solid shape for the bounding box has the potential advantage that it is easier to calculate if the voxels are rectangular solids oriented along the x, y and z axes. The dimensions of the box in the x, y, and z directions are called W, H, and D respectively. For each component, an elongation E is optionally defined as $2D/(W+H)$, and a volume V is optionally defined as WHD. Finally, each component is assigned a score, for example $VE^2$. Note that, for a component with W comparable to H, the score is about $D^3$, the cube of the length of the component in the z direction. For a component with W>>H, or H>>W, the score is smaller, about $4D^3H/W$ or $4D^3W/H$ respectively. The six components with the greatest score are optionally then marked as large leg bone seeds (since there are three large leg bones, the femur, tibia, and fibula, in each leg), as long as their score is above a certain threshold, for example 1 liter. If fewer than six components pass this threshold, then optionally it is assumed that the scan does not include all large leg bones, for example because the CT scan does not extend below the knees. In this case, only the components which passed the threshold are marked as large leg bones. Optionally, if it is known in advance that the CT data includes fewer than six large leg bones, for example in a patient with an amputated leg, or if it is known that the CT scan only extends down to the knees, then an appropriate number smaller than six is used. The large leg bone seeds typically have a higher score than components of bv2 from any other bones of the body, because the large leg bones are longer in the z direction than any other bone, and they have W comparable to H. The largest aorta component of bv2, which includes most of the aorta because the blood in the aorta is very uniform in image density, has a much lower score than the large leg bone seeds, because it has W very different from H. Any other expression for the score which is large for long components with W comparable to H, and small otherwise, is optionally used instead.

At 106 in FIG. 1, each of the large leg bone seeds is identified. The z coordinate of the center of each large leg bone seeds is found, and the seeds are sorted by z coordinate. (The z coordinate is assumed to be increasing in the direction from the head to the feet of the patient, for definiteness in describing this procedure.) The four large leg bone seeds with the largest z coordinate are identified as seeds of the lower large leg bones, the tibias and the fibulas, and the other two large leg bone seeds are identified as seeds of the femurs. This can be done because, as noted above, the procedure for finding bv2 is designed so that there is expected to be only one seed found for each large leg bone. At 108, the knees are identified. Components of bv2 which were not possible large leg bone seeds, but which have their centers at z coordinate intermediate between the seeds of the femurs and the lower large leg bones are identified as seeds of the patella (knee bones). There is no concern that these components might be blood vessels, because there are no blood vessels in the legs that are large enough to be included in bv2.

Figure 3:
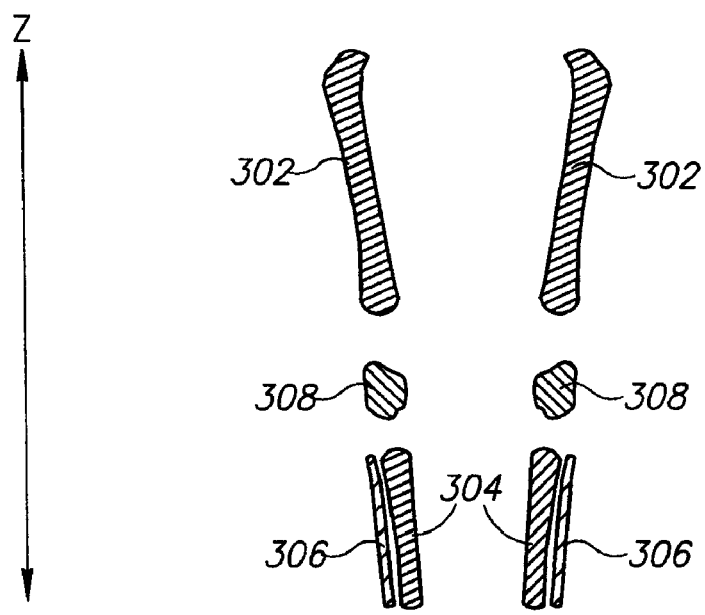
FIG. 3 is a schematic view of large leg bone and knee components found by the method in FIG. 1, in one exemplary run.

FIG. 3 shows the leg bones seeds that have been identified by the procedure outlined above, including the femurs 302, the tibias 304, the fibulas 306, and the patellas 308. Because bv2 only includes voxels with density greater than 1800, the seeds found and shown in FIG. 3 are not the complete leg bones, but are used to find the complete leg bones at 110 of FIG. 1 (for the large leg bones) and 112 of FIG. 1 (for the knees).

Find the Ends of the Large Leg Bones and the Rest of the Knees

To find the ends of the large leg bones, and the rest of the knees, which have density too low to have been included in the set bv2, voxels are found which have a density exceeding a threshold T3 which is lower than T2, in an exemplary embodiment of the invention. Optionally, voxels are considered only within certain ranges of z. These ranges are optionally defined in terms of the length L (in the z direction) of the femur bone seed, and in terms of the z coordinate k of the center of the knee bone seed, and the maximum z coordinate $z_1$ of the lower leg bone seeds. For example, the ranges include the range around the knees with z coordinate ranging from k−0.15L to k+0.075L, and the range around the ankles with z coordinate ranging from $z_1$−0.25L to $z_1$+0.25L. This range also includes part of the feet closest to the ankles; the bones in the rest of the feet are found later with the other non-leg bones. Alternatively, different ranges, defined in terms of L or defined absolutely, are used instead. If too small a range is used, then parts of the bones might be missed. If too large a range is used, then some blood vessels may be included.

In the femur bone seed, the ranges of z optionally include the range from the minimum z coordinate of the femur seed to the first value of z at which the cross-sectional area of the femur seed is greater than 40% of the maximum cross-sectional area of the femur seed, and the range beginning from the z at which the cross-sectional area first drops below 20% of the maximum cross-sectional area. These values of 40% and 20% are not critical, and other values may be used that are not very close to 100% or 0%. Using values that are too close to 0% would exclude too much of the femur seeds from the ranges, and the ends of the femurs might not be found completely. Using values that are too close to 100% would exclude too little of the femur seeds from the ranges, possibly resulting in finding blood vessel voxels, since blood vessels tend to be found closer to the femur in the central part of the femur than near the ends of the femur. The second value is smaller than the first value, since, for example, if 40% where used for both values, and if the cross-sectional area fell to 39% immediately after reaching 40% as a result of noise or other small errors in the data, then hardly any of the femur seed would be excluded from the ranges.

It should be noted that the ends of the femurs nearest to the pelvis are not included in any of these ranges of z, but those ends of the femurs are optionally found later, when the non-leg bones are found. If the same method were used to find the ends of the femurs near the pelvis, then parts of the pelvis might also be included, as well as blood vessels, such as the iliac arteries, that are close to the pelvis. For this reason, it may be advantageous to find the upper ends of the femurs using the method used for non-leg bones, which include special techniques for rejecting nearby blood vessel voxels, as will be described below.

The ends of the large leg bones are found by including voxels within these ranges of z for which the density is greater than T3. For example, T3 is 1220, a value low enough to include the lower density ends of the large leg bones and the entire patella, but high enough to exclude most non-bone tissue in the legs. These voxels constitute a third set of bone voxels, called bv3. Optionally voxels are only included in bv3 if they are part of a connected volume that includes one of the bone seeds from bv2. This prevents the inclusion of blood vessel voxels, which have high image density (if the blood contains contrast agent), but are not part of a connected volume of high density voxels that includes the bone seeds. The voxels in bv3 together with the voxels in bv2 form the leg bone components.

Figure 4:
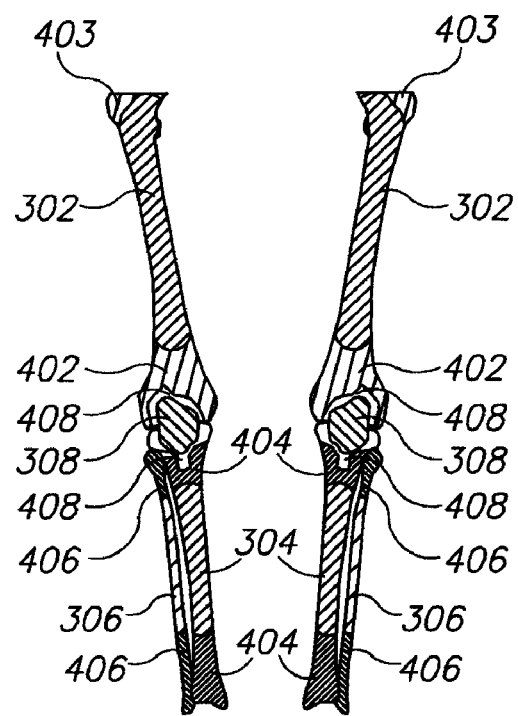
FIG. 4 is a schematic view showing the leg bones after the ends of the large leg bones and the rest of the knees have been found by the method in FIG. 1 in one exemplary run.

The resulting leg bone components are shown schematically in FIG. 4. The femur seeds 302 have been expanded to include their ends 402 toward the knees, though not most of their ends 403 toward the pelvis, the tibia seeds 304 have been expanded to include their ends 404, the fibula seeds 306 have been expanded to include their ends 406, and the patella seeds 308 have been expanded to include less dense regions 408 of the patellas.

Finally, in 114 of FIG. 1, the set of voxels in the leg bone components is optionally dilated by a small distance, for example by two voxels, or by up to 1 mm, in the XY plane. This procedure adds to the leg bone components those voxels that partially overlap the edges of the leg bones, and which may not have been included in the leg bone components previously because their average density was too low. This distance is small enough so that the added voxels are unlikely to include the interiors of blood vessels, or at most a few of the added voxels might partially overlap some small blood vessels. Including these partial bone voxels among the bone voxels is potentially useful, even if they also include some non-bone tissue, since they may have image density that is high enough to be annoying when viewed in a MIP image of the blood vessels from which the bone voxels have been excluded.

Find Seeds for the Other Bones

FIG. 5 shows a flowchart 500, giving an overview of a method used to find the other bone components, outside the large bones of the legs and the knees, optionally after the large leg bones have been found, in an exemplary embodiment of the invention, using the method outlined in FIG. 1 for example. Each of the acts shown in FIG. 5 will be described briefly here, and further details will be presented below, in and following the descriptions of FIGS. 6 through 14. At 502, seeds are found for the non-leg bones, but these seeds typically also include some blood vessel seeds. If the leg bone components have already been found, then the voxels of the leg bone components are not considered as candidates for non-leg bone seeds. But optionally voxels are considered whose z coordinate extends as far as part of the femur, for example one third of the way in z from the beginning to the end of the femur bone components that were found previously. This range of z is sufficient to include all of the pelvis, which overlaps the upper part of the femur in z, and it also includes the low density end of the femur nearest the pelvis, which was not included in the leg bone components found using the method shown in FIG. 1. At 504, the blood vessel seeds are distinguished from the bone seeds. At 506, the bone seeds are expanded to find the full bone components.

At 508, morphological fill operations are optionally used, for example, to include in the bone components lower density regions completely or almost completely surrounded by bone, such as marrow. At 510, certain bone components found by mistake are eliminated. For example, bone components are eliminated which have volume smaller than a threshold, for example 3.5 cubic centimeters, since this is smaller than any bone of interest, and any bone component of such small volume found by the method may be an error. Using a threshold of 3.5 cubic centimeters may eliminate small bones of the fingers and toes, and a lower value for this threshold, and perhaps for some of the density thresholds as well, is optionally used if finding small bones of the fingers and toes is of interest. Lower thresholds are also optionally used for children and infants, since an infant may, for example, have vertebrae that are smaller than 3.5 cubic centimeters. Finally, in 512, bone fragments are optionally found, and added to the bone components, as will be described below.

To find the bone seeds, a set of voxels is optionally first found with density greater than a threshold T11, for example 1390. This threshold is high enough so that typically only some thin regions at the surface of the non-leg bones, the densest parts of these bones, are found, together with voxels in the interiors of blood vessels with contrast agent. Optionally, a second set of voxels is then found, with density greater than a slightly lower threshold T12, for example 1340. This second set of voxels is then eroded once, removing all voxels on the surface. The union of the first and second set constitutes a set of seed voxels. Using the union of these two sets of voxels to find the seeds may produce more robust results than using only one of the sets. Alternatively either one of these sets is used by itself as the set of seed voxels.

Each connected region in the set of seed voxels is generally either a bone seed or a blood vessel seed, or possibly part of an organ containing a lot of blood, such as a kidney. The bone seeds are often only one or two voxels thick, near the surface of the bone. The blood vessel seeds typically extend across the entire lumen of the blood vessel, except perhaps for voxels which only partially overlap the lumen, since the density of the blood, which is due to the contrast agent, is uniform across the blood vessel. For large blood vessels, the lumen may be many voxels across, a fact which may be used to distinguish large blood vessel seeds from bone seeds, as will be described in more detail below. Optionally, anatomical knowledge is also used to distinguish bone seeds from seeds of blood vessels, and from parts of organs containing a lot of blood.

In general, unlike the case for the leg bones in the method shown in FIG. 1, there will be more than one seed for each bone. For this reason, it is possible to use a method for distinguishing bone seeds from blood vessel seeds which errs on the side of eliminating some bone seeds, but reliably eliminates all blood vessel seeds. Optionally, more than 50% of the bone seeds (i.e. the seeds whose voxels are eventually identified as bone voxels when the bone segmentation is complete) are eliminated at this stage. The eliminated bone seeds will not matter, as long as there survives at least one seed for each bone, so that when the bone seeds are expanded, all the bones are found. But it is important to eliminate blood vessel seeds at this stage, in those embodiments of the invention in which the method does not provide any way to eliminate a blood vessel seed later, once it has been accepted in error as a bone seed.

Distinguishing Blood Vessel Seeds from Bone Seeds

Figure 6:
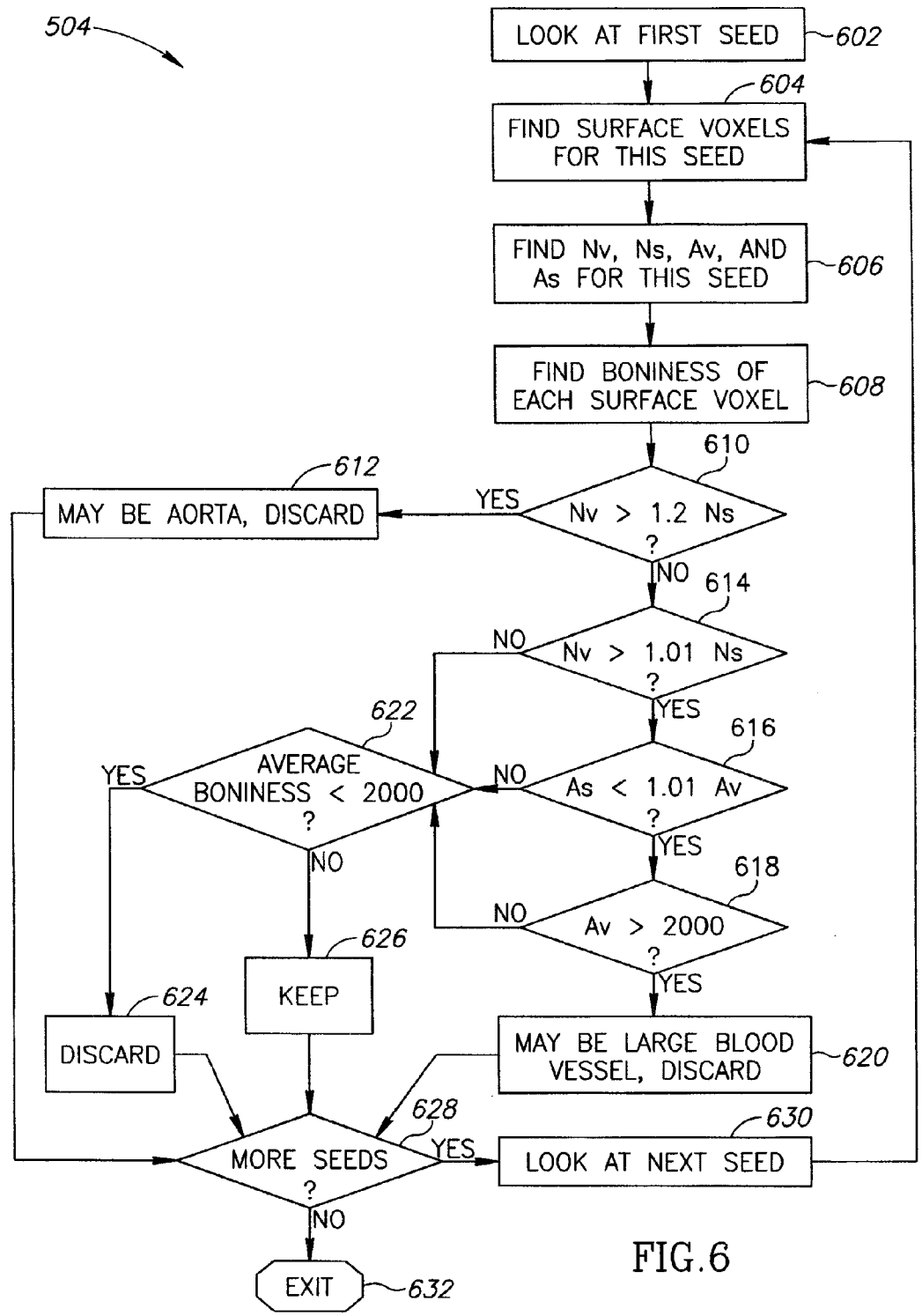
FIG. 6 is a flowchart showing a method for distinguishing bone seeds from blood vessel seeds, a detail of the method shown in FIG. 5.

Some of the details of act 504, distinguishing blood vessel seeds from bone seeds, are shown in the flowchart in FIG. 6, according to an exemplary embodiment of the invention. At 602, the first seed to be examined is chosen. At 604, the surface voxels for this seed are found. At 606, the number of surface voxels $N_S$ is optionally found, as well as, optionally, the total number of voxels $N_V$ in the seed, the average density $A_S$ of the surface voxels, and the average density $A_V$ of all the voxels in the seed. At 608, a boniness score is found for each surface voxel in the seed. The details of act 608, according to some embodiments of the invention, are shown in FIG. 7, and will be described below. The quantities found at 606 and 608 need not be found in that order, and alternatively are found at any time before they are needed for another part of the method. Alternatively, some parts of act 504 are not performed at all, and any quantities needed only for those parts of act 504 are optionally not found at all. For example, any of the tests involving $N_V$, $N_S$, $A_V$, and $A_S$, made at 610, 614, 616, and 618, described below, are optionally omitted. At 610, it is optionally calculated whether or not $N_V$ is greater than $1.2 N_S$. If it is, then the seed is suspected of being part of the aorta, which is typically many voxels across, and it is optionally discarded in 612. For at least some bone seeds, which are often only one or two voxels across, $N_V$ will not be much greater than $N_S$. Alternatively, a number greater than or less than 1.2 is used for this test.

At 614, 616, and 618, other blood vessel seeds are optionally eliminated by considering whether $N_V > 1.01 N_S$, $A_S < 1.01 A_V$, and $A_V > 2000$ are all true. If all three of these statements are true, then the seed is somewhat large in diameter, very uniform in density, unlike a bone seed which is likely to be hollow, and very high in density, higher than any bone is likely to be, so it is likely to be a large blood vessel seed, and it is discarded at 620. The numbers 1.01, 1.01, and 2000 given above are merely examples, and greater or smaller numbers are alternatively used.

At 622, if the seed has survived the previous tests, the average boniness score for its surface voxels is optionally calculated. If the average, optionally a weighted average, is less than a threshold value, for example 2000, then the seed is suspected of possibly being a blood vessel seed, and it is optionally discarded at 624. Alternatively, an average boniness score is calculated for all voxels, not only for surface voxels. Alternatively, another number is calculated from the distribution of boniness scores of the voxels, for example the fraction of voxels with boniness scores less than a certain value. Calculating the average boniness score of the surface voxels, and discarding seeds for which the value is less than 2000, is simply an example of one among many possible procedures that is relatively fast, and that appears to work well for eliminating blood vessel seeds.

If the average boniness is greater than the threshold value, then it is almost certain to be a bone seed, and it is accepted at 626. At 628, it is checked whether all the seeds have been examined. If there are more seeds remaining, then at 630 the next seed is chosen for examination, and act 604 is repeated for the new seed. Alternatively, act 604 is only performed for some seeds, depending for example on the x, y, and z coordinates of the seed, and different tests are performed on other seeds, or they are not tested at all. When all seeds have been examined, act 504 exits in 632.

Calculating the Boniness Score of a Voxel

FIG. 7 shows details of act 608, for calculating the boniness score of a voxel, in an exemplary embodiment of the invention. At 702, a calculation is made of responses $r_1$ and $r_2$ of the image density profile around the voxel, using filters $f_1$ and $f_2$ respectively, along each of the x, y, and z axes. The meaning of this statement will be explained with reference to FIGS. 8, 9, and 10. Alternatively, different filters are used, or a boniness score based on only a single filter is used, or a boniness score is used which is not based on three axes, or is not based on these three axes. The same filter or filters need not be used on all axes. However, the expression calculated at 704, described below, which is based on filters $f_1$ and $f_2$, is relatively fast to compute, and has been found in tests to be effective at distinguishing between bone and blood vessel voxels, when used on the x, y, and z axes and combined into a boniness score as calculated at 706, described below.

FIGS. 8A and 8B show respectively a typical profile 802 of the image density of a bone, across the bone, and a typical profile 808 of the image density of a blood vessel across the blood vessel. Each tick mark on the x-axis represents one voxel. The image density profile for the bone is hollow, being much lower in the center of the bone than near the surface, while the image density profile of the blood vessel is very uniform, since the contrast agent is uniformly distributed within the blood. The boniness score is one way which helps to distinguish between these two types of density profiles. Typically, the voxel whose boniness score is being found will be on the surface of the bone, such as voxel 806, or on the surface of the high density part of the blood vessel, i.e. on the inner surface of the blood vessel, such as voxel 810. In each case, the calculation will take into account the image density over a range 804 of voxels around the voxel whose boniness score is being found. For example, the filter looks at a range of 5 voxels in each direction from voxel 806, or a total of 11 different voxels on the x-axis. It should be noted that all of the voxels within range 804 need not be part of the seed being examined, in order to be taken into account in calculating the boniness score of voxel 806.

FIGS. 9A and 9B show plots 902 and 904 of filter functions $f_1$ and $f_2$ respectively, at each of 11 different points on the x-axis, within a range 804 of the origin. Each point within range 804 in FIG. 9A and FIG. 9B corresponds to one of the voxels in range 804 in FIGS. 8A and 8B. Beyond this range, the filter functions are plotted as having values of zero in FIGS. 9A and 9B. The origin 906 on the plots in FIGS. 9A and 9B corresponds to the voxel whose boniness score is being calculated, voxel 806 in FIG. 8A or voxel 810 in FIG. 8B.

The response $r_1$ of the image density profile at a voxel to the filter function $f_1$ is defined as the convolution of the image density profile with the filter function, the filter function being centered at that voxel. The response $r_2$ is defined in the same way, but using filter function $f_2$ instead of $f_1$. FIG. 10A schematically shows plots 1002 and 1004 respectively of $r_1$ and $r_2$ as functions of voxel position across a hollow density profile, such as bone density profile 802. A voxel 1006 is at the center of the bone. For either voxel 806 near the right edge of the bone, or a voxel 1008 near the left edge, $r_2$ tends to be positive, and greater than the magnitude of $r_1$, although the sign of $r_1$ differs on the two edges.

The responses are quite different for a flat density profile, such as blood vessel density profile 808. FIG. 10B schematically shows plots 1010 and 1012 of $r_1$ and $r_2$ respectively, as functions of voxel position across blood vessel density profile 808. A voxel 1014 is at the center of the blood vessel lumen. For either voxel 810 near the right edge of the blood vessel lumen, or a voxel 1016 near the left edge, the magnitude of $r_1$ tends to be greater than $r_2$.

The boniness score of a voxel is based on $r_2 - |r_1|$, which tends to be positive for voxels near the surface of a bone, and negative for voxels near the surface of a blood vessel lumen. This is true along an axis which is normal to the surface. For an axis which is parallel to the surface, both $r_1$ and $r_2$ tend to be close to zero for bones or for blood vessels. The boniness score of a voxel is defined as the maximum of 0, $r_{2(x)} - |r_{1(x)}|$, $r_{2(y)} - |r_{1(y)}|$, and $r_{2(z)} - |r_{1(z)}|$, where the (x), (y) and (z) in the subscripts indicate that $r_1$ or $r_2$ is evaluated along the x, y, or z axis. Regardless of how the surface of the bone or blood vessel is oriented with respect to the x, y, and z axes, the boniness score will tend to be higher for voxels on or near the surface of a bone than for voxels on or near the surface of a blood vessel lumen.

The boniness score defined by the procedure described is only one example of a procedure that distinguishes hollow density profiles, that are typically found for bones, from flat density profiles, that are typically found for blood vessels. Although this particular procedure has the advantage that it is relatively fast and has been found to be effective at distinguishing bone voxels from blood vessel voxels, many other procedures are possible, and may be used instead. For example, the distribution of image densities may be found for neighboring voxels of the voxel being evaluated. For a blood vessel voxel, the distribution of image densities may tend to be bimodal, with most voxels either at or near the maximum image density, or at a much lower density, while for a bone voxel, the distribution may tend to include more intermediate values. A quantitative measure of the bimodality of the distribution is optionally used as the basis for a boniness score.

Expand the Seeds to Find the Bone Components

FIGS. 11A and 11B show a flowchart giving the details of act 506 for expanding the bone seeds into bones, in an exemplary embodiment of the invention, once the blood vessel seeds have been distinguished from the bone seeds and discarded in act 504, as shown in FIG. 6. Act 506 involves defining a local cost for a voxel, which is low if the voxel is likely to be a bone voxel, and high otherwise. A voxel is accepted as part of the bone if its score falls below a certain threshold; the score is defined as the minimum path integral of the local cost for any path connecting that voxel to the bone seed. In act 506, as described below, the score of a voxel is calculated, and the voxel to be examined is chosen, using an implementation of the Dijkstra algorithm. Alternatively, any other algorithm known to the art, for minimizing path integrals, is used instead.

At 1106, the voxels in the envelope of the bone seeds are found, i.e. all voxels outside the bone seeds which are adjacent to voxels on the surface of the bone seeds. At 1108, the local cost is calculated for each voxel in the envelope. The details of how this is done, in an exemplary embodiment of the invention, are described below with reference to FIG. 12. Alternatively, any local cost is defined which is low for voxels likely to be bone and high otherwise. However, the particular expression described with reference to FIG. 12 has been found effective at eliminating almost all non-bone voxels, including high density blood vessel voxels, while finding almost all of the bone voxels.

The score assigned to each voxel in the envelope of the bone seeds is just the local cost. Later, when the bone seeds are expanded into bone components, and the envelope of the expanded bone components is found, the score assigned to a voxel in the new envelope will be an integral of local costs along a path of voxels connecting that voxel to one of the bone seed voxels, as will be explained below.

At 1110, an envelope voxel r with the lowest local cost is found. Optionally, this is done by sorting the voxels into a heap according to their local cost. Although other sorting algorithms are optionally used instead of heap sorting, using heap sorting has the potential advantage that it may be computationally faster than other sorting algorithms. Optionally, the location in the heap structure of a voxel with known coordinates is obtained by means of a hash table, as is known in the art. A hash function is applied to the coordinates of the sought voxel. The result is an index to the hash table, where the index to the location of the voxel in the heap structure is stored. Whenever a voxel is added to or removed from the heap structure, the hash table is updated. Alternatively, any other method known in the art is used to find a voxel with known coordinates, in the heap or in any other structure used for sorting the voxels.

At 1112, the score of voxel r is compared to a threshold. The threshold is, for example, 120,000. If the score is greater than the threshold value, then the bone components are considered completely expanded, and the method exits at 1118. Although there may be other voxels in the CT data which, looked at in isolation, have a high boniness score, they are not included among the bone voxels because there is no continuous path of bone voxels connecting them to a recognized bone seed.

If the score of voxel r is below the threshold, then voxel r is added to the existing bone components (which are initially just the bone seeds) at 1120. The purpose of acts 1122 through 1132 is to find local costs and scores for the any voxels that will need to be added to the envelope in the next iteration (i.e. with voxel r now included as part of the bone components), and to re-evaluate the score for existing envelope voxels whose scores might be lowered due to paths which go through voxel r, which weren't considered before voxel r was added to the bone components. Once the local costs and scores are known for the new envelope, it will be possible to pick out the next voxel r, and to perform the next iteration, until all the bone components are fully expanded.

At 1122, all the neighboring voxels of r, which are not already in the bone components, are found. These neighboring voxels constitute all the voxels that might need to be added to the envelope in the next iteration, and all the voxels in the existing envelope whose scores might be affected by the inclusion of voxel r in the bone components. The first of these neighboring voxels, which will be referred to as voxel n, is chosen at 1124. At 1126, the method looks at whether voxel n is in the existing envelope (as defined before voxel r was added to the bone components). If it is, then the method checks whether the score of voxel n has to be revised due to the inclusion of voxel r among the bone components. At 1128, the score of voxel r is added to the local cost of voxel n times the distance between the centers of voxel r and voxel n in millimeters, and the result is compared to the existing score for voxel n, at 1130. If this result is found to be lower than the existing score of voxel n, then the existing score is replaced by a new score equal to this result, at 1132.

If voxel n is not in the existing envelope, then it will be included in the new envelope of the bone components including voxel r. The local cost of voxel n is calculated at 1134, using the same method used at 1108, which will be described in FIG. 12. Then, at 1136, the score of voxel n is set equal to the score of voxel r, plus the local cost of voxel n times the distance in millimeters between the centers of voxels r and n.

As noted above, the voxels in the envelope are optionally stored in a heap structure, according to their local cost. At the next iteration, voxel r, which has the lowest local cost, will be added to the bone component, so it will no longer be part of the envelope of the bone component, and it is removed from the heap. If a voxel n is found which is not in the existing envelope, then it will be added to the envelope in the next iteration, and hence it is added to the heap. In general, when an element is removed from or added to a heap, the heap is rectified, so that the elements therein obey the heap property. To save computation time, however, the heap is optionally not rectified immediately after voxel r is removed from the heap, since it may turn out that a voxel n will be added to the heap, in which case the heap will have to be rectified again. If no voxel n is added to the heap during a given iteration, then the heap is rectified before the next iteration begins, so that the voxel with the lowest local cost in the new envelope can be found.

It should be noted that with this procedure, the score of any voxel is the minimum path score for any path connecting that voxel to any bone seed voxel, where the path score is the local cost integrated along the path. The goal of expanding the bone components is to count as bone voxels all voxels which are connected to a bone seed along a path of voxels whose integrated local cost is less than the threshold score, 120,000 in the example given above. This criterion for counting a voxel as a bone voxel reflects the fact that bone voxels are not necessarily the highest density voxels in the body, but they have fairly high density (as well as other characteristics such as hollowness and low vesselness), and they are found in fairly large connected regions of other voxels which have the same characteristics, and which also include connected regions of even higher density (the bone seeds).

At 1138, it is seen whether there are any more neighboring voxels to r, which have not been examined yet. If there are, then the next neighboring voxel n is chosen at 1140, and act 1126 is performed again. If there are no more neighboring voxels to voxel r, then a new envelope is defined at 1142, consisting of the existing envelope voxels plus all the voxels n that are neighbors of voxel r and aren't already envelope voxels or bone component voxels. The method then returns to 1110 for the next iteration, and finds a new voxel r which has the lowest local cost of any of the voxels in the new envelope. The process continues, with one iteration for each voxel added to the bone components, until the bone seeds have been fully expanded into bone components, i.e. until the method reaches 1118 and exits. The method is guaranteed to come to an end after a finite number of iterations, even if there were an infinite number of voxels in the CT data set, because the local cost is always positive and greater than some minimum value, and because the score of the new voxel r is always greater than the score of the previous voxel r by the local cost of the new voxel r times the distance (also greater than some minimum value) between the new voxel r and the old voxel r. Thus the score will eventually exceed the threshold at 1112, and the process will end.

Calculating the Local Cost of a Voxel

FIG. 12 shows more details of method 1108, used in FIGS. 11A and 11B for finding the local cost of a voxel, in an exemplary embodiment of the invention. At 1202, the boniness score $s_1$ of the voxel is found, optionally using method 608 as described in FIGS. 7 through 10B, where the boniness score of a given voxel depends on the image densities of other nearby voxels, not just on the image density of the voxel whose boniness score is being found. However, the boniness score need not be calculated in the same way at 1202, for the purpose of expanding the bone seeds, as it is at 608, for the purpose of evaluating the seeds to determine if they are bone seeds or blood vessel seeds. For example, different choices may be made for any of the options described in the description of FIGS. 7 through 10B. This may be advantageous if the optimal definition of boniness is different for the two purposes. Typically, the boniness score of a given voxel will still depend on the image densities of other nearby voxels.

At 1204, $s_1$ is tested to see whether it is below a threshold. If $s_1$ is below the threshold, for example if $s_1$ is below 500, then at 1206 the local cost is set equal to $f(s_1)$, where f is a monotonically decreasing function, to be described below. The reason for choosing a monotonically decreasing function is so that the local cost will be low for voxels that are likely to be bone, and high for voxels that are unlikely to be bone. This threshold is optionally set at a low enough level so that, if $s_1$ is below the threshold, the voxel is unlikely to be bone. That will often be true for most voxels in the envelope of the bone component, at any given stage in expanding it, since many or most voxels at the surface of the bone seed will likely be at the surface of the bone.

If $s_1$ is above the threshold, however, then it may not be so clear whether the voxel is a bone voxel or a blood vessel voxel, and a more complicated calculation is optionally performed to find the local cost of the voxel, taking into account not only the boniness score of the voxel, but also a "vesselness" score $s_2$, which is calculated at 1208. Alternatively, only the boniness score $s_1$ is used to evaluate the local cost, even if $s_1$ is above the threshold. The details of method 1208 for calculating the vesselness score are given below with reference to FIG. 13. This vesselness score, which is often more computationally expensive than the boniness score, generally only needs to be calculated for a minority of voxels, those on the "expanding front" of the bone component, for example. At 1210, the local cost is set equal to a function $g(s_1,s_2)$. Optionally $g(s_1,s_2)$ is equal to $f(\max\{0, s_1-200s_2\})$. Alternatively, the "200" in this expression is replaced by a greater or smaller number, or g is another function which is a monotonically decreasing function of $s_1$ and increasing function of $s_2$, at least for $s_1$ in the range between about 500 and 1200 where it is not obvious whether the voxel is bone or blood vessel. However, tests have shown that using this form for $g(s_1,s_2)$ provides good discrimination between bone voxels and blood vessel voxels when expanding the bone seeds. If a number much lower than 200 were used in the above expression for g, then the local cost would depend almost entirely on the boniness score, and hardly at all on the vesselness score. If a number much higher than 200 were used, then any voxel with a vesselness score greater than zero would be treated as a blood vessel voxel, and eliminated from consideration as a bone voxel. Using a number around 200 results in the local cost depending in a significant way on both the boniness score and the vesselness score. Once the local cost of the voxel is found, either at 1206 or 1210, the method exits at 1212.

The monotonically decreasing function f(x) is optionally chosen to be much lower for x greater than 1000 (in which case the voxel is likely to be bone) than for x less than 500 (in which case the voxel is quite unlikely to be bone). For example, f=11200 for x<500, f=2200 for 500<x<700, f=1000 for 700<x<1000, f=100 for 1000<x<1200, and f=10 for x>1200. This particular form for f(x) has been tested, and found to be effective in finding the bone voxels while excluding non-bone voxels, in expanding the bone, using the threshold score of 120,000 for stopping the expansion, as described above. Alternatively, another expression is used for f(x). For example, f is proportional to a negative power of x, such as $x^{-5}$ or $x^{-6}$, and is equal to 1500, for example, at x=700. Alternatively, f is any very large number for x<500, any very small number, or zero, for x>1100, and decreases linearly for 500<x<1100, for example from 2500 at x=500 to 100 at x=1100. Any expression for f(x) which is much larger for x<500 than for x>1000, and makes a smooth transition for 500<x<1000, is also likely to work well, although a different number may be better to use for the threshold score at which the bone expansion is stopped, if f(x) is defined differently.

Calculating the Vesselness Score of a Voxel

FIG. 13 shows a flowchart for method 1208, calculating the vesselness score of a voxel, optionally used as part of method 1108 described in FIG. 12, in an exemplary embodiment of the invention. In CT data, the lumens of blood vessels containing contrast agent tend to look locally like long narrow circular cylindrical regions of high image density voxels, surrounded by voxels of lower image density. Bones, on the other hand, because they tend to have hollow density profiles, look locally more like flat plates of high image density surrounded on each side by lower image density voxels. Other regions of high image density, such as organs containing a lot of blood, may look locally like globular regions of high image density surrounded by lower image density voxels, and voxels which have high image density due to noise often have even higher image density voxels adjacent to them, at least in some directions. The vesselness score is designed to have a high value for voxels which look locally like the lumens of blood vessels, and a low value for voxels which look locally like bone, organs, and noise.

To distinguish between these cases, the Hessian matrix of the image density is used. The Hessian matrix of the image density in three-dimensional space is a 3×3 matrix, whose elements are the second derivatives of the image density with respect to all combinations of the three spatial coordinates, x, y, and z. Because blood vessels, bones, and other features of the body can in general be oriented in any direction with respect to the x, y, and z axes, the vesselness score is defined in terms of the three eigenvalues of the Hessian matrix, which are invariant with respect to rotations of the coordinate system. When the x, y, and z coordinates are oriented along the eigenvectors of the Hessian matrix, then the Hessian matrix is diagonal, and its eigenvalues are the second derivatives of the density with respect to x, y, and z. The directions of the eigenvectors of the Hessian matrix reflect the symmetries of the image density distribution. For a voxel inside a long narrow cylinder of high density surrounded by low density, the eigenvectors of the Hessian matrix will be oriented in the radial, azimuthal, and longitudinal directions. The eigenvalues associated with the radial and azimuthal eigenvectors will be large and negative, and comparable in value, and the eigenvalue associated with the longitudinal eigenvector will be small in magnitude. For a voxel inside a flat plate of high density surrounded by low density, two eigenvectors of the Hessian matrix will be oriented in the plane of the plate, and will have small associated eigenvalues, while the third eigenvector will be oriented normal to the plate, and will have a large negative eigenvalue. For a voxel located inside a high density blob, the three eigenvalues will tend to be comparable in magnitude and negative. For a voxel that is part of a region of noise, the eigenvalues will, on the average, be comparable, and are equally likely to be positive or negative. The vesselness score depends on the three eigenvalues, and it is defined so that it is high in the first of these four cases, and low in the other cases.

Since the density in a blood vessel drops sharply within one voxel of the inner surface of the lumen, and is uniform inside the lumen, the Hessian matrix will be zero inside the lumen, and will be very large, and change by a large amount from one voxel to the next, near the inner surface of the lumen. To make the value of the Hessian matrix more robust, instead of using the actual second derivatives of the density, the elements are defined in terms of the correlation of the density with the second derivatives of Gaussian functions (or similar peaked functions, for example cubic or quadratic splines) of x, y, and z, with width comparable to the diameters of blood vessels of interest. Calculated this way, the eigenvalues of the Hessian matrix will have the characteristic behavior described above, not just in a narrow region near the edge of the lumen, but in a broad region inside the lumen.

Optionally, the width of the peaked functions is chosen to be comparable to the width of the iliac arteries at the point where they are closest to the pelvis, since distinguishing the iliac arteries from the pelvis is typically one of the most challenging tasks in bone segmentation. The inner lumen of the iliac arteries at this point is typically 5 mm in diameter, and it has been found that using a Gaussian function with full width at half maximum between 4 and 6 mm, for example, results in a vesselness score which is particularly effective at distinguishing between bone voxels and blood vessel voxels in this region. The resulting vesselness score may also be useful for distinguishing larger and smaller blood vessels from bone.

Optionally, Gaussian or other peaked functions are used with greater width than 6 mm, or narrower width than 4 mm. Optionally, information about anatomy is used to choose a width for the function which is different in different locations in the body, depending on the z-coordinate for example, if blood vessels of different diameters are most challenging for bone segmentation in different parts of the body. For example, a different width for the Gaussian function is used for voxels that are in or close to the neck, where the vertebral cervical artery passes close to the vertebrae, than for voxels that are in or close to the pelvis, since the vertebral cervical artery is smaller in diameter than the iliac arteries that pass close to the pelvis. Once the large leg bones have been identified, it is possible to use the z-coordinate of a voxel to determine if it is much closer to the pelvis or much closer to the neck. For voxels located about halfway between the pelvis and the neck, it may not matter very much what width of Gaussian function is used, since major blood vessels do not come so close to the bone in this region.

At 1302, the Hessian matrix for the density around the voxel is found. At 1304, the eigenvalues of the Hessian matrix are found. FIGS. 14A, 14B, and 14C show examples of what the directions of the eigenvectors (shown by the directions of the arrows) and the relative magnitudes of the corresponding eigenvalues (shown by the lengths of the arrows) will typically be, for different kinds of high density structures that the voxel is near the edge of. In FIG. 14A, the structure is a blood vessel 1400, and the eigenvectors and eigenvalues are shown for the Hessian matrix of the density at voxel 1402, on the edge of the high density region (i.e. on the inner surface of the blood vessel). There are two eigenvectors $e_1$, shown by arrow 1404 in the radial direction, and $e_2$, shown by arrow 1406 in the azimuthal direction, that have corresponding eigenvalues that are large and comparable in magnitude, while the third eigenvector $e_3$, shown by arrow 1408 in the longitudinal direction, has a corresponding eigenvalue that is much smaller, since the blood vessel is fairly uniform along its length.

In FIG. 14B, the eigenvectors and corresponding eigenvalues of the Hessian matrix are shown for a voxel 1414 on the surface of a bone with a dense outer layer 1410. The inner region 1412 of the bone, containing the marrow, for example, has lower density, and the dense outer layer 1410 is somewhat thin compared to the diameter of the bone. In this case, eigenvector $e_1$, shown by arrow 1416 in the radial direction, has a corresponding eigenvalue of large magnitude, while eigenvectors $e_2$ and $e_3$, shown by arrows 1418 and 1420, have corresponding eigenvalues that are much smaller.

FIG. 14C shows the eigenvectors and corresponding eigenvalues of the Hessian matrix for a voxel 1424 on the surface of a blob-like structure 1422. The three eigenvectors, shown by arrows 1426, 1428 and 1430, have corresponding eigenvalues that are all comparable in magnitude.

The vesselness score is defined so that it will be high if two of the eigenvalues are negative, and are comparable and much greater in magnitude than the third eigenvalue, as in FIG. 14A, while the vesselness score will be small if one of the eigenvalues is much greater in magnitude than the other two, as in FIG. 14B, or if all three are comparable in magnitude, as in FIG. 14C, or if any of the larger eigenvalues are positive.

The vesselness score is found by first finding the two eigenvalues $e_1$ and $e_2$ with the greatest magnitude, at 1306. At 1308, the parameter c is set equal to $-(e_1+e_2)/\sqrt{2}|e|$, where e is the vector whose components are $e_1$, $e_2$, and $e_3$. It should be noted that, if $e_1$ and $e_2$ are negative and equal to each other and much larger in magnitude than $e_3$, as in FIG. 14A, then c will be equal to 1. If $e_1$ is negative and much larger in magnitude than $e_2$ and $e_3$, as in FIG. 14B, then c will be equal to 0.71. If $e_1$, $e_2$, and $e_3$ are all negative and equal in magnitude, as in FIG. 14C, then c will be $2/\sqrt{6}$, which is about 0.8. If the eigenvalues are comparable in magnitude but vary randomly in sign, as in voxels that are dominated by noise, then c will be $2/\sqrt{6}$ or less.

The vesselness score $s_2$ optionally depends on c, but the differences in c between the three different cases are optionally magnified. At 1310, if c<0.8 the vesselness score is set equal to 0 at 1312. At 1314, if 0.8<c<0.9, then the vesselness score is set equal to c at 1316. At 1318, if c>0.9, the vesselness score is set equal to c+0.5. These steps are optionally performed because, if c<0.8 the voxel is unlikely to be a blood vessel voxel, so the value of c should preferably not influence the local cost $g(s_1,s_2)$ even if c is close to 0.8, while if c>0.9, the voxel has a good chance of being a blood vessel voxel, and the local cost should preferably be raised enough so that the bone expansion tends to avoid including that voxel. Only if c is between 0.8 and 0.9, the intermediate regime between FIGS. 14A and 14C, does the exact value of c have much influence in deciding whether to include the voxel in the bone components. After finding the vesselness score, the method exits at 1320. Alternatively, any other expression is used for the vesselness score, provided it has the property that it is large if $e_1$ and $e_2$ are negative and much greater in magnitude than $e_3$, and small otherwise.

Whether the local cost is based on the boniness score alone or also on the vesselness score, calculating the local cost of a voxel generally requires knowing the image density of certain other voxels in the vicinity of that voxel. In method 506, shown in FIG. 11, it may often happen that the local cost, using the exemplary definition described above, needs to be calculated for several voxels that are close to each other, and that these calculations need to know the imaging densities of some of the same nearby voxels. In order to save time in fetching the image densities from memory, all of the image densities that are needed for a given iteration within method 506 are optionally fetched only once, and stored in a cache from which they are easily accessible. Similarly, in 622 in FIG. 6, the boniness score is evaluated for all the surface voxels of a seed, and in some cases the image density of a same nearby voxel is needed to calculate the boniness score of two or more different surface voxels of the seed. In this case too, the image densities are optionally fetched only once, and stored in a cache.

Morphological Fill Operations

Referring back to FIG. 5, once all the bone seeds have been expanded fully, at 506, morphological fill operations are optionally performed at 508, in an exemplary embodiment of the invention, so that low density regions completely or almost completely surrounded by bone, such as marrow, are included in the bone components. Optionally, this is done using all of the bone components, both leg bones and non-leg bones together, rather than separately for the leg bone and non-leg bone components. Using the combined leg bone and non-leg bone components together ensures that the marrow of the femurs, which is surrounded partly by leg bone components (the lower femurs) and partly by non-leg bone components (the upper femurs, found with the non-leg bones as noted above), will be included in the morphological fill operations.

Optionally, for each bone component, a single 3D morphological fill operation is performed. However, performing a single 3D fill operation has the potential disadvantage that if there is even a single narrow connected path of low density voxels leading from the low density interior region to the surface of the bone, then the low density interior region will not be filled. A possibly more robust method of filling in interior low density regions is to perform a series of 2D morphological fill operations, on each plane of voxels parallel to the XY plane, on each plane of voxels parallel to the XZ plane, and on each plane of voxels parallel to the YZ plane. This method will generally include all or almost all of the marrow and other interior low density regions in the bone component, even if there is a narrow path of low density connecting the interior to the outside of the bone.

It should be noted that the morphological fill operations as described here may not be appropriate if the method is intended to be used for the skull, since the fill operations would cause the entire brain to be included in the bone components.

Find Bone Fragments

In 512 of FIG. 5, bone fragments are optionally found, in an exemplary embodiment of the invention. Bone fragments are portions of bones which have or seem to have unusually low density, and which therefore are not found in 502. For example, the thin parts of the vertebrae may be less than one voxel thick, and the average density of the voxels that contain them may be less than their actual density. Even though these bones are not found in their entirety, small portions of these bones, with higher apparent density than most of the bone, may be found by looking for any voxels with density greater than some rather low threshold for bone, for example 1100, which are not part of a connected volume greater than a certain size, for example 3.5 cubic centimeters. Including these bone fragments in the bone components is useful, since, even with their low density, the bone fragments may still interfere with viewing of the blood vessels in a MIP image. It is very unlikely that these voxels would be blood vessel voxels with apparent density reduced by the partial volume effect, since the blood vessel would have to be just the right width and be positioned at just the right place relative to the edges of the voxels.

An exemplary computer used to perform bone segmentation according to the procedures described above has a 2.4 GHz Intel Xeon CPU, and 4 GB of RAM. To perform bone segmentation on a CT data set comprising a full body scan of 1400 slices covering 1.5 meters in z (excluding the head and the lower part of the feet), it requires about one minute. Alternatively, a slower computer is used, or an alternative form of the algorithm is used, which requires more time, for example up to 10 minutes.

As used herein, "non-leg bones," "bones outside the legs" and similar expressions include bones in the feet.

The invention has been described in the context of the best mode for carrying it out. It should be understood that not all features shown in the drawings or described in the associated text may be present in an actual device, in accordance with some embodiments of the invention. Furthermore, variations on the method and apparatus shown are included within the scope of the invention, which is limited only by the claims. Also, features of one embodiment may be provided in conjunction with features of a different embodiment of the invention. As used herein, the terms "have", "include" and "comprise" or their conjugates mean "including but not limited to."

The invention claimed is:

1. A method of automatically identifying bone voxels in a medical image data set of voxels that includes at least a portion of the large bones of the legs and at least a portion of the bones outside the legs, the method comprising:
   a) identifying at least a portion of the voxels belonging to large bones of the legs by applying a first procedure to the voxels of the data set, comprising finding first connected sets of volume greater than a minimum volume, of voxels having density greater than a first minimum density;
   b) identifying at least a portion of the voxels belonging to bones of the body outside the legs, by applying a second procedure to the voxels of the data set, comprising finding second connected sets of voxels having density greater than a second minimum density; and
   c) excluding those voxels from the second connected sets of voxels that satisfy a criterion involving one or more of average density, uniformity of density, and thickness, thereby excluding voxels belonging to the aorta exceeding a threshold level of contrast agent;
   wherein the second minimum density and the criterion are chosen so that voxels belonging to the large leg bones would also be excluded if the second procedure and the criterion were applied to them.

2. The method according to claim 1, wherein the data set is defined with a z-coordinate where the z axis is a longitudinal axis of the body, the method also including identifying at least a portion of the voxels belonging to the knee bones by:
   a) distinguishing femur voxels from lower leg bone voxels by their z-coordinates; and
   b) identifying as belonging to the knee bones, voxels exceeding a threshold image density, whose z-coordinates are intermediate between the range of z-coordinates of the femur voxels and the range of z-coordinates of the lower leg bone voxels.

3. The method according to claim 1, wherein the image data set is defined in an x-y-z Cartesian coordinate system having an x, y, and z axis where the z axis is a longitudinal axis of the body, and the x axis is a left-right axis of the body, and wherein the criterion comprises:
   a) finding connected regions of voxels which have an image density exceeding an image density threshold value;
   b) for each connected region, finding a range W in x-coordinate, a range H in y-coordinate, and a range D in z-coordinate, of the centers of the voxels in the region; and
   c) identifying as belonging to the large leg bones a set of the connected regions for which the range W is similar in to the range H, and the range D is larger than for the other connected regions.

4. The method according to claim 3, wherein finding connected regions of voxels comprises excluding connected regions which are less than a minimum volume, and the minimum volume and the image density threshold value of the image density are chosen so that any connected regions comprising voxels of blood vessels in the legs are excluded, but at least one connected region comprising voxels of large leg bones is not excluded.

5. The method according to claim 1, wherein the data set is defined with a z-coordinate where the z axis is a longitudinal axis of the body, and wherein the first procedure comprises selecting voxels having image density greater than a first threshold value, such that only voxels in a central portion of each of the large bones of the legs are identified, the method also comprising identifying voxels belonging to end portions of the large bones of the legs, by selecting voxels which have image density greater than a second threshold value lower than the first threshold value, and which have their z-coordinate within a range determined by the locations of the voxels in the central portions of the large bones of the legs.

6. The method according to claim 5, wherein the range excludes a central portion of the femur where blood vessels are close to the femur.

\* \* \* \* \*